United States Patent
Felker

(10) Patent No.: US 10,569,129 B2
(45) Date of Patent: Feb. 25, 2020

(54) TRI-POWER EXERCISING DEVICE

(71) Applicant: Thomas S. Felker, Paradise Valley, AZ (US)

(72) Inventor: Thomas S. Felker, Paradise Valley, AZ (US)

(*) Notice: Subject to any disclaimer, the term of this patent is extended or adjusted under 35 U.S.C. 154(b) by 108 days.

(21) Appl. No.: 15/683,535

(22) Filed: Aug. 22, 2017

(65) Prior Publication Data

US 2017/0368409 A1 Dec. 28, 2017

Related U.S. Application Data

(63) Continuation-in-part of application No. 15/484,519, filed on Apr. 11, 2017.

(Continued)

(51) Int. Cl.

| | |
|---|---|
| *A63B 23/035* | (2006.01) |
| *A63B 22/00* | (2006.01) |
| *A63B 23/02* | (2006.01) |
| *A63B 22/06* | (2006.01) |
| *B62K 21/12* | (2006.01) |
| *B62M 3/14* | (2006.01) |
| *B62M 15/00* | (2006.01) |

(Continued)

(52) U.S. Cl.
CPC ...... *A63B 23/03583* (2013.01); *A63B 22/001* (2013.01); *A63B 22/0087* (2013.01); *A63B 22/0605* (2013.01); *A63B 23/0222* (2013.01); *B62K 21/125* (2013.01); *B62M 1/12* (2013.01); *B62M 1/26* (2013.01); *B62M 3/14* (2013.01); *B62M 15/00* (2013.01); *B62M 23/00* (2013.01); *A63B 21/0435* (2013.01); *A63B 21/225* (2013.01); *B62M 2003/006* (2013.01); *B62M 2009/005* (2013.01)

(58) Field of Classification Search
CPC ............ A63B 23/03583; A63B 22/001; A63B 22/0087; A63B 22/0605; B62M 1/12
See application file for complete search history.

(56) References Cited

U.S. PATENT DOCUMENTS

| | | |
|---|---|---|
| 535,256 A | 3/1895 | Marty |
| 581,985 A | 5/1897 | Fritz |

(Continued)

*Primary Examiner* — Kevin Hurley
*Assistant Examiner* — Michael R Stabley
(74) *Attorney, Agent, or Firm* — Schmeiser, Olsen & Watts LLP

(57) ABSTRACT

Tri-Power Exercising device allows a rider to simultaneously, or on demand, exercise virtually all muscle groups in his lower and upper body. The device includes a bicycle frame, pedals, forearm bars, sliding seat, computer and electronic display recommending energy modulation amounts from various muscle groups to optimize physical performance on any given trek. Because riders can exercise virtually all muscle groups at once, they reduce their exercising time, continuously builds muscle tissue throughout their whole body, and exercises their cardiovascular and respiratory systems completely. Riders operate the device by rotating legs on the pedals, rotationally oscillating the forearm bars up and down with their arms and shoulders, and then use core muscles to pull and push the seat back and forth on the slider. Inverted racks, pinion gears, and one-way bearings turn this linear power from the oscillating forearm bars and sliding seat into torque that rotates the crank axle.

26 Claims, 14 Drawing Sheets

Related U.S. Application Data

(60) Provisional application No. 62/323,447, filed on Apr. 15, 2016, provisional application No. 62/377,847, filed on Aug. 22, 2016, provisional application No. 62/377,837, filed on Aug. 22, 2016.

(51) Int. Cl.
| | |
|---|---|
| *B62M 1/12* | (2006.01) |
| *B62M 23/00* | (2006.01) |
| *B62M 1/26* | (2013.01) |
| *A63B 21/04* | (2006.01) |
| *A63B 21/22* | (2006.01) |
| *B62M 3/00* | (2006.01) |
| *B62M 9/00* | (2006.01) |

(56) References Cited

U.S. PATENT DOCUMENTS

| | | | |
|---|---|---|---|
| 5,330,218 A | 7/1994 | Escudero | |
| 5,785,336 A | 7/1998 | Jang | |
| 7,891,686 B1 | 2/2011 | Crawford | |
| 8,562,488 B2 * | 10/2013 | Alberts | A61H 1/02 482/1 |
| 8,608,622 B2 * | 12/2013 | Alberts | A61H 1/02 482/1 |
| 8,876,663 B2 * | 11/2014 | Alberts | A61H 1/02 482/1 |

\* cited by examiner

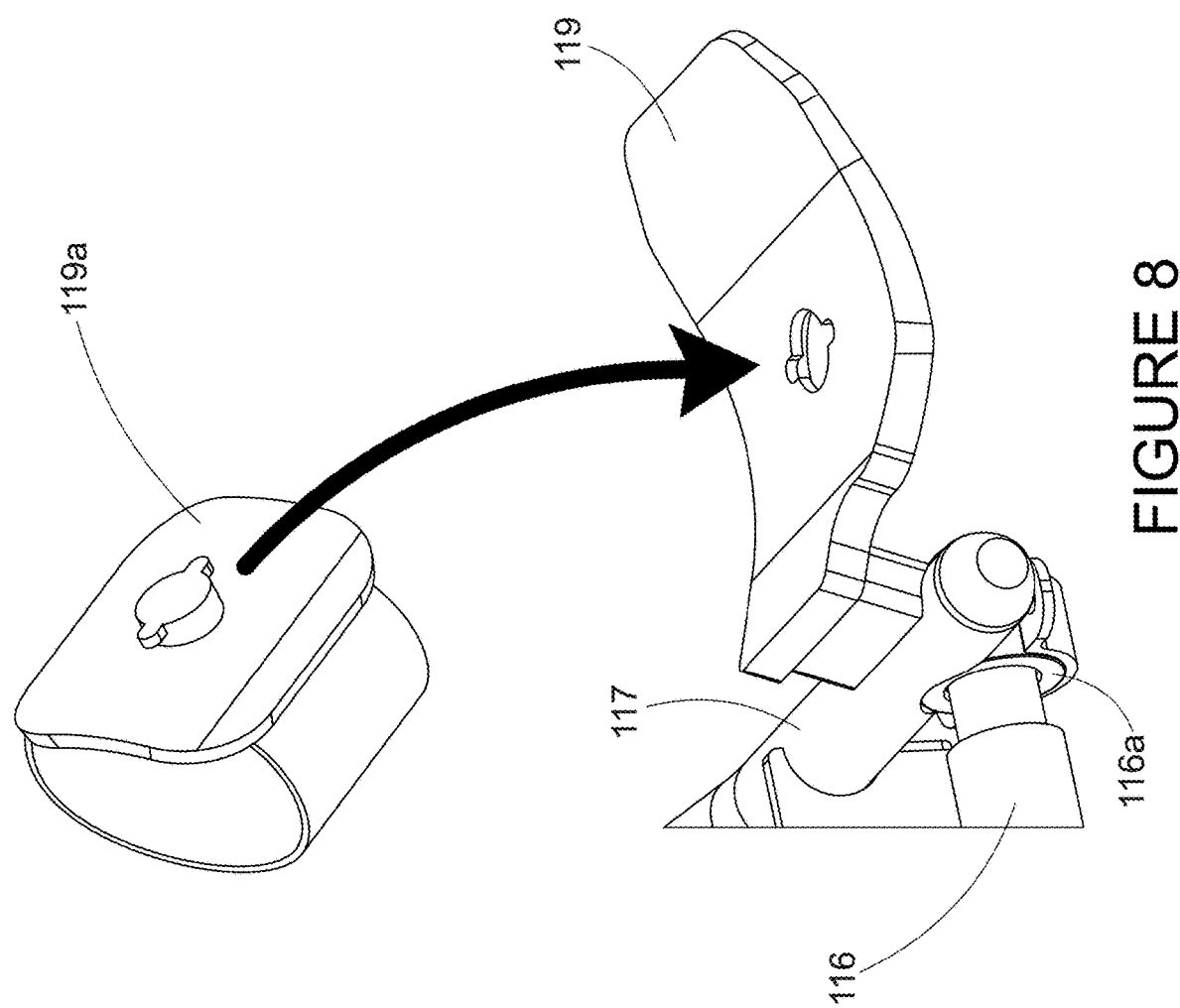

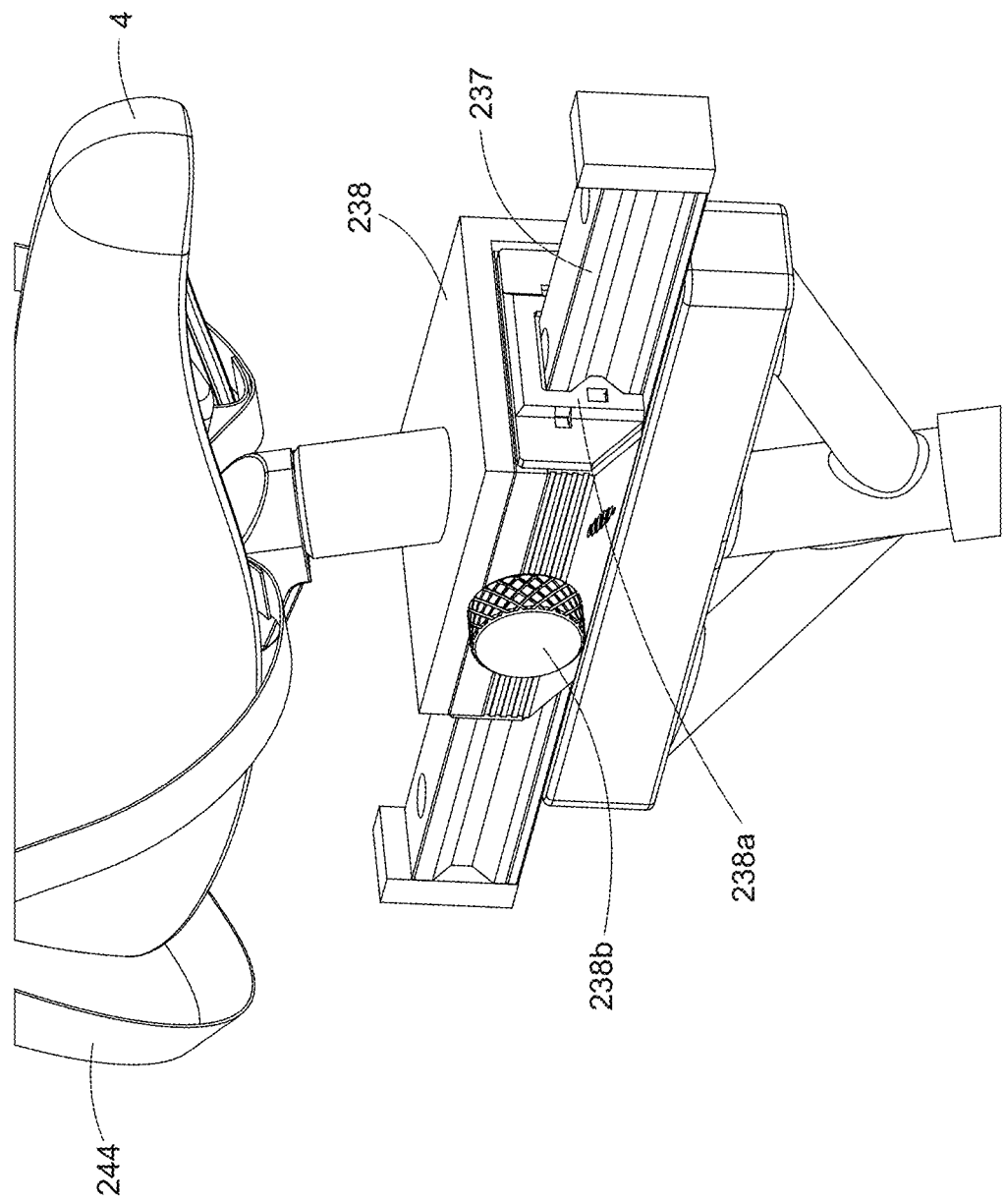

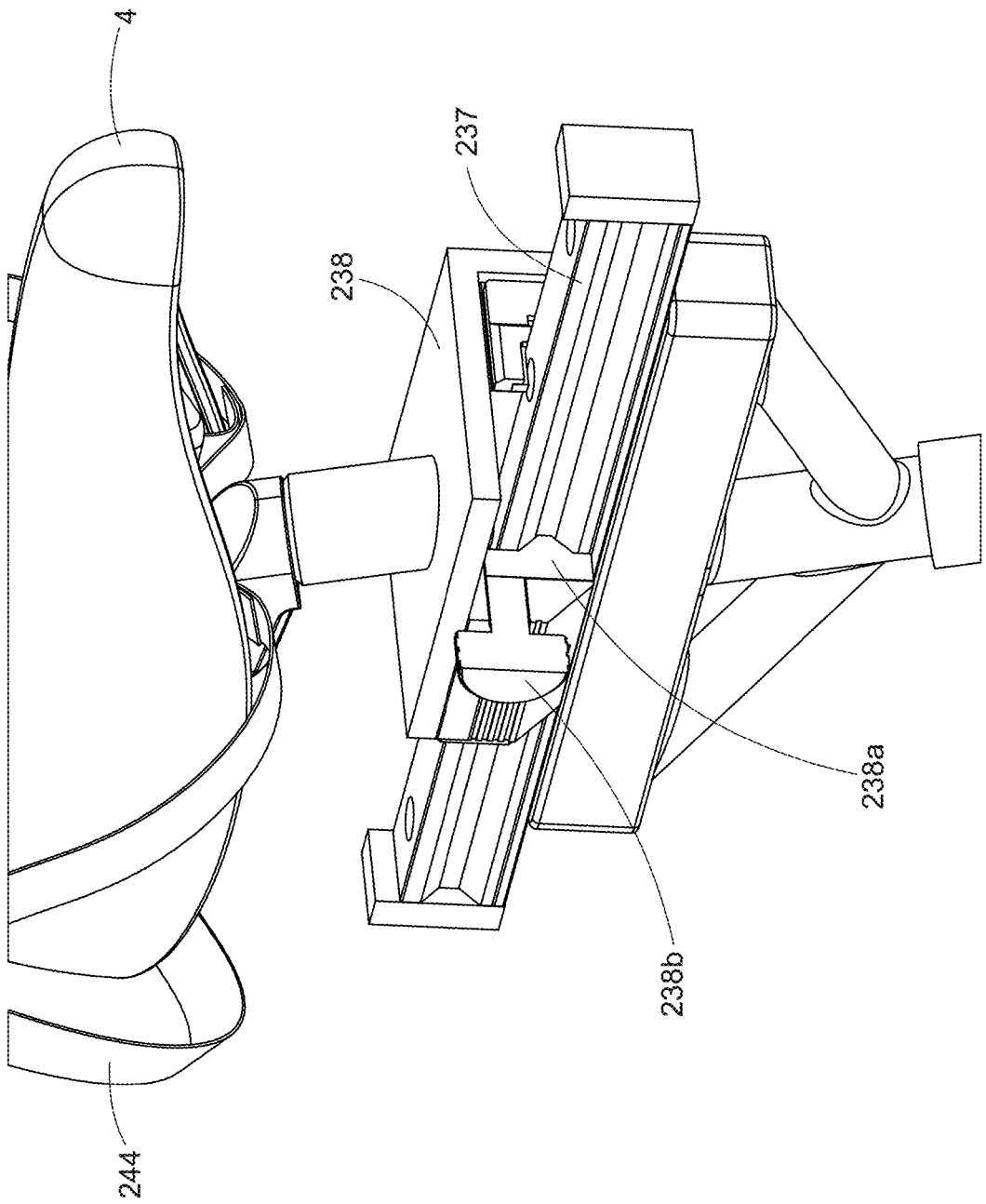

TRI-POWER EXERCISING DEVICE

CROSS REFERENCE TO RELATED APPLICATION[S]

This application is a continuation-in-part of U.S. patent application entitled "BICYCLE DUAL POWER TURNING TRACK, RACK, PINION, AND ONE-WAY BEARING PROPULSION SYSTEM", Ser. No. 15/484,519, filed Apr. 11, 2017, currently pending, which claims priority to U.S. Provisional Patent Application entitled "BICYCLE DUAL POWER RACK, PINION, AND ONE-WAY BEARING PROPULSION SYSTEM," Ser. No. 62/323,447, filed Apr. 15, 2016, and claims priority to U.S. Provisional Patent Application entitled "TRI-POWER EXERCISING DEVICE," Ser. No. 62/377,847, filed Aug. 22, 2016, and claims priority to U.S. Patent Application Ser. No. 62/377, 837, filed on Aug. 22, 2016, the disclosures of which are hereby incorporated entirely herein by reference. Additionally, U.S. patent application Ser. No. 15/683,509, filed on Aug. 22, 2017, is filed on the same day as this application and is incorporated entirely herein by reference.

BACKGROUND OF THE INVENTION

Technical Field

The invention of the Tri-Power Exerciser relates to an exercising machine that can be used by riders to simultaneously, or on demand, exercise all major muscle groups located in the three major sections of muscle tissue in the human body. They consist of: a) the legs and thighs, b) arms and shoulders, and c) core area of a rider's abdomen and back.

State of the Art

There are some patents and products on the market that provide an ability for users to ride a stationary bike while simultaneously exercising both their upper and lower body muscles, in conjunction with their cardio systems. Representative of these patents and products is U.S. Pat. No. 7,789,808 B2 by Lee, et al. In Lee's patent, riders can: a) exercise their legs by rotating them on a set of pedals, b) exercise their arms and shoulders by rotating them on a set of hand cranks, and c) exercise their core muscles by engaging the linkage mechanism on their exercise machine. Engaging Lee's linkage mechanism connects a sliding seat to a rod that is indirectly attached to either the rotating hand cranks or rotating pedals. The torque created from riders rotating their hands or legs not only rotates the fly wheel, but it also forces the seat to slide back and forth over its slider. The Lee patent is completely different from the instant Enablement of the Tri-Power Exerciser for the following reasons: a) in order for riders to slide the rear seat, Lee requires that the rider must first engage a linkage mechanism, which will then cause the rotating pedals or hand cranks to slide the rider's seat; whereas with a Tri-Power Exerciser, riders use only their core muscles to slide their seat and body over the slider, without any assistance from their legs or arms and shoulders; b) Lee's invention has riders rotating their arms on arm cranks to provide torque from their arms and shoulders to rotate the flywheel; whereas with the Tri-Power Exerciser, riders attach their elbows into forearm bar holders, and then vertically rotate their forearms up and down in unison providing torque from each up and down power stroke to rotate the resistance flywheel; and c) Lee's exercising device strictly uses 360 degree rotational torque from either the rider's legs or arms to assist the rider in powering the sliding seat; whereas with a Tri-Power Exerciser, the inventor designed an independent housing containing two inverted racks, two pinion gears, two one way bearings, and an axle holding them in position to convert the rider's linear generated sliding seat power into rotational torque that turns the crank axle.

In addition, with the Tri-Power Exerciser, riders create the initiating linear energy from either oscillating their forearm bars up and down, separately sliding their seat back and forth over the slider, or using their legs to rotate their pedals. Alternatively, the riders can use any combination of the foregoing functional means to rotate the crank axle whichever they choose.

Another example of related art is U.S. Pat. No. 6,682,462 B1, also invented by Lee, et al. This second Lee patent is also completely different from the instant Enablement for the following reasons: a) with the Lee machine, the rider sits in a recumbent position with his legs located parallel to the ground, and he uses his legs and arms together to slide his seat; whereas with the current invention, the rider sits in an upright position with his legs positioned perpendicular to the ground, his legs are mounted on pedals, and his legs have no involvement in the rider sliding his seat; b) with Lee's exerciser, the riders rotate their legs on a set of pedals, which are connected directly to the flywheel axle, and thereby he directly inputs torque into the flywheel; whereas with the current invention, the riders rotate their legs to turn a set of pedals that are connected to a crank axle located in the mid-section of the exercise machine, and then a chain transfers the leg created energy into the resistance flywheel; c) the Lee exerciser permits riders to exercise their legs, upper back, and core together pushing back with their legs while simultaneously pulling back on a rope that is indirectly connected to the resistance flywheel, this rope is then automatically rewound back to its original position such that the rider only inputs torque during this one directional pull, much like with a rowing machine; whereas with the instant Tri-Power Exerciser, riders are able to simultaneously, or separately, input torque into the resistance flywheel during: 1) both the up and down vertical and in-unison power oscillations of their arms, 2) leg rotation of the pedals, and/or 3) sliding back and forth on their slider from use of their core muscle groups; and d) Lee's exercise machine creates torque to rotate the resistance wheel from direct rotation of their legs, or pulling on a rope that rotates a wheel, which in turn rotates the resistance flywheel; whereas with the Tri-Power Exerciser, it converts linear power into torque through use of a housing containing two inverted racks, two pinion gears with two one-way bearings, an axle holding them together, and a sprocket and chain.

Another example of related art is U.S. Pat. No. 6,682,462 B1, invented by Gerry K. Kelly. Kelly's patent is also completely different from the instant Tri-Power Exerciser for the following reasons: a) the purpose of Kelly's invention is to provide an exercising machine that primarily exercises the rider's abdominal and back muscles by having the rider's legs supply energy to a hydraulic motor that pumps hydraulic fluid through hydraulic lines to cause the carriage to oscillate gently relative to the frame, thereby causing exercisers to use their abdominal and back muscles to re-position themselves in the carriage in order to keep their balance; whereas with the instant invention, the rider is able to simultaneously, or on demand, input torque into a resistance flywheel during: 1) both the up and down vertical oscillations of their arms in unison with one another, 2) leg rotation of the pedals, and 3) sliding their seat and torso back and forth on the slider from use of their core muscle groups; b) the Kelly patent uses rotational energy from the rider to indirectly cause a hydraulic pump to push hydraulic fluid through hydraulic lines that oscillates the rider's seat; whereas the Felker invention directly uses human muscle energy to rotate a resistance flywheel, and c) the Kelly invention is designed to cause the carriage to rock and roll which in turn necessitates movement of the rider's torso in order to keep his balance; whereas with this Tri-Power Exerciser invention, the riders constantly have their elbows and forearms affixed into elbow holders so that they will automatically enjoy stability of their torso and will not lose balance during the exercise activity.

SUMMARY OF THE INVENTION

Despite the above described prior art offerings to provide simultaneous upper and lower body exercise capability to stationary spin, exercise, and recumbent bicycles, there is no prior art that provides riders with the ability to simultaneously, or on demand, input torque into a resistance flywheel during: 1) both the up and down vertical rotational oscillations, in unison, of their arms with power strokes, 2) leg rotation of the pedals, and 3) sliding their seat back and forth over the slider from use of their core muscle groups. In recumbent bicycles, the power strokes may be provided by pushing and pulling in either a vertical rotational oscillations or in back and forth horizontal oscillations.

The purpose of the Tri-Power stationary exercise bike is to allow riders to exercise virtually all the muscle groups in their body at the same time. This allows many people, who currently do not have extra time to take from their busy schedules for exercising on today's inefficient exercise equipment, to be able to complete their work-out in a shorter period of time. This is because from exercising virtually all muscle groups at the same time, they are able to cut at least 40% from their current exercise schedule and still achieve their required cardiovascular, respiratory and muscle tissue exercise requirements. Also, by simultaneously engaging most all of the groups in their body, riders are inputting more energy into the resistance flywheel than is currently possible with today's inefficient exercise devices. This increased energy output, measured in watts and additional calories burned over a given time, assists riders in reducing the time required to burn fat from their bodies. Alternatively, riders can also exercise individual sections of the 3 major muscle groups, or any combination thereof, legs, arms and shoulders, or core.

The Tri-Power Exerciser is comprised of:
a. An exerciser bike frame in which the crank axle can be located near the center of the frame,
b. Two forearm bars are positioned on the upper front of the bike, and their hand grips are grasped by the rider, who on demand, rotationally and in unison, pulls them up, and then pushes them down, always using power strokes;
c. These forearm bars are connected together with a yoke, and the front end of an adjustable rod is attached to the yoke, and the rear end of a connecting rod is attached to a splitter;
d. The leverage adjustment brackets are attached to the front end of a connecting rod, and the rear end of a connecting rod is attached to a splitter. The splitter has attached to it two inverted racks, which lineally move back and forth over two pinion gears. The pinion gears are attached to two one-way bearings, which are connected to the crank axle;
e. The back and forth movement of the inverted two racks culminates in creating torque in the one-way bearings that drive the crank axle and driving wheel in a forward direction;
f. A set of pedals and cranks are also attached to the crank axle, and turning these pedals causes rotation of the same crank axle that can also be powered by rotational oscillation of the forearm bars;
g. A seat plus seat belts are affixed to a slider. This seat and slider slide over a fixture positioned on top of the post tube; riders are able to slide their seat back and forth because their elbows are attached into the elbow platforms; these stationary elbow platforms, into which the rider's elbows are held in place, allow riders to work muscle groups in their core and back by sliding their torso forward and backward as they push their body back, and then pull it forward, utilizing their stationary forearm holders to hold their elbows and shoulders in a stationary position;
h. The back of the rider's seat has seat belts that hold their torsos affixed to their seat while they slide it back and forth over the sliding bar;
i. The back of the slider has the front of two inverted racks attached to it, so that as riders slide the slider forward and backward, the racks also move lineally forward and backward;
j. The back end of the racks are positioned inside a housing, with one residing on top of the first pinion gear and the other positioned on the underside of the second pinion gear. As the rider slides back and forth, the racks are pushed in and out over their respective inverted pinion gears, causing them to rotate opposite one from the other; but because both pinion gears reside on one-way bearings, this causes the axle upon which they both rotate to always rotate in the same direction, even though the inverted racks oscillate together in unison back and forth;
k. Attached to the outer end of the housing's axle is a sprocket, over which a chain is positioned; a second sprocket is attached onto the crank axle, and the lower end of this chain is also placed over the chain teeth of this lower sprocket which is attached to the crank axle;
l. Thus, as riders slide their seat over the sliding fixture, it lineally moves the inverted racks, which in turn rotate both pinion gears in the opposite direction, one from the other, and because there are two one-way bearings attached to the axle upon which these gears rotate, they only permit this axle to rotate in one direction, which is the same direction that the crank axle is rotating; the top chain sprocket attached to the end of this axle then rotates from torque inputted to it from the upper rear axle upon which it is attached; the chain then transfers this torque to the crank axle, which causes it to rotate from power delivered from riders exercising their core and back muscles as they slide forward and backward on their seat; and
m. Within the confines of the length of the sliding rack, there is an infinite amount of movement and power that riders can make from sliding their seat forward and backward. For example, if they slide forward 1", then they input 1" of power (watts) into the crank axle; if they slide the slider forward 12", then they input 12" of power into the crank axle.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 8 is an oblique view of an elbow and forearm holder in which the rider is able to fasten in place his elbow and forearms, and thereby use them as a stationary point from which he pushes and pulls his torso as he slides his seat back and forth over the slider;

FIG. 11A is a perspective view of a sliding seat assembly that can be coupled to a frame of a tri-power exercising device; and FIG. 11B is a partial section perspective view of a sliding seat assembly that can be coupled to a frame of a tri-power exercising device.

LIST OF PARTS USED IN INVENTION AND LOCATED IN DRAWINGS

Figure 1:
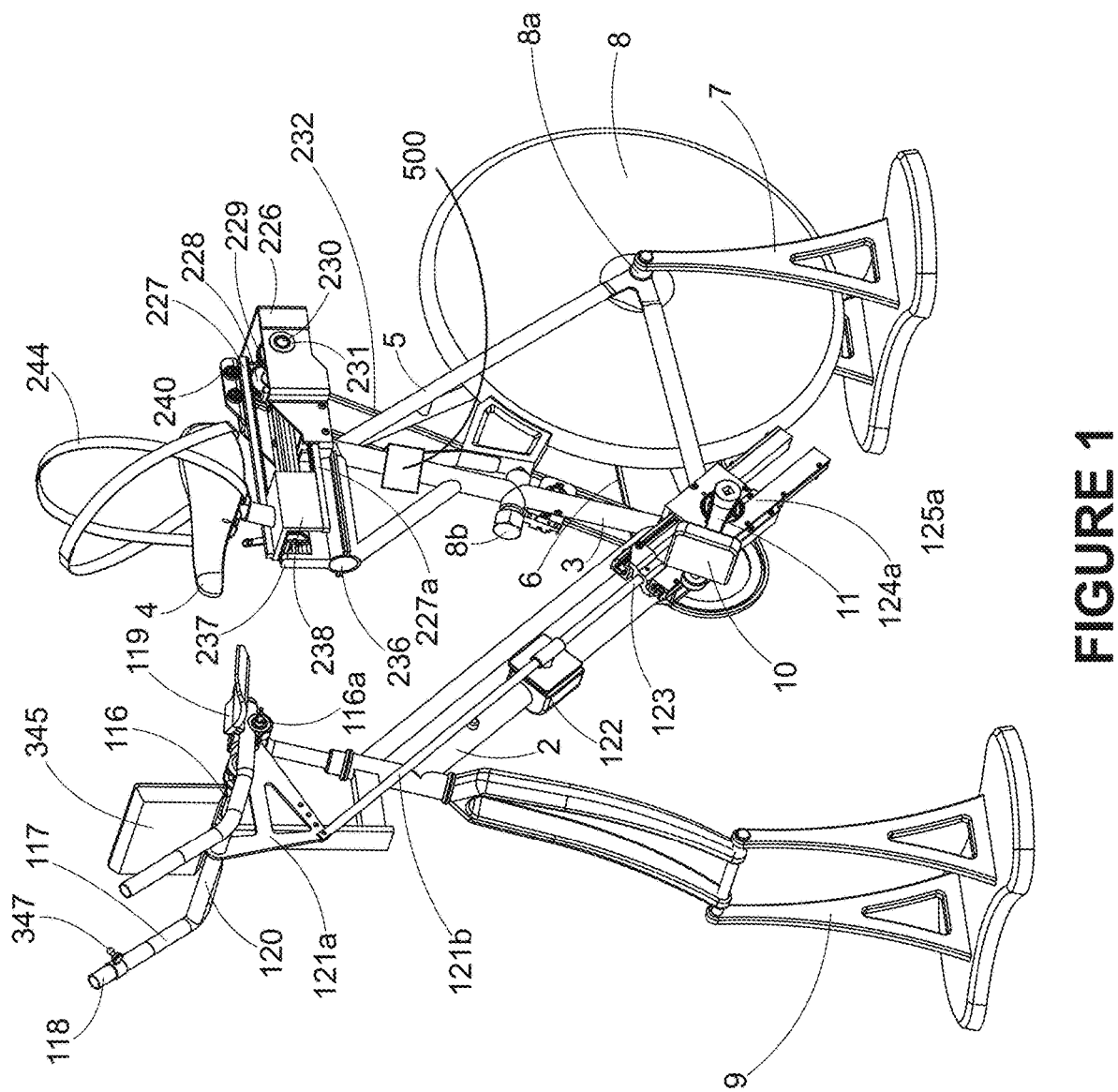
FIG. 1 is a perspective view of the preferred embodiments of the present invention.

List of the Invention's Component Parts:
Basic Parts used in most all stationary and standard exercise bikes are denominated as parts 1-15 in this List of Component Parts, and they are not unique to the current invention. Parts related to transferring linear created power from the forearm bars to the lower crank, wherein such linear power is turned into torque to rotate the crank axle, are labeled in the 100 series. Those parts related to transferring linear created power from the back and forth sliding seat, and also turning it into torque that rotates the crank axle, are labeled in the 200 series. Those parts relating to an electronic display for modulation recommendations to riders regarding the optimization of their physical fitness performance wherein modulation recommendations are calculated by the on board processor and based upon bio marker data gathered contemporaneously by biosensors that monitor the muscle groups that are being worked during the exercise activity are labeled in the 300 series.

The part number and nomenclature for the first 15 parts are as follows:
1) Bicycle Frame;
2) Down Tube;
3) Seat Tube;
4) Seat;
5) Seat Stay;
6) Chain Stay;
7) Rear Stand;
8) Resistance flywheel;
   8a) One-way bearing located between the resistance flywheel 8a and the axle upon which it rotates; (Not Shown)
   8b) Flywheel Resistance Controller
9) Front Stand;
10) Left Pedal;
11) Left Crank;
12) Right Pedal
13) Right Crank
14) Crank Axle Housing;
15) Crank Axle connecting the left side pedal crank and right side pedal crank with the right and left chain sprockets attached to this same crank;

List of parts in the 100 series related to transferring and turning linear created power from the oscillating forearm bars into torque that rotates the crank axle are:

116) Fulcrum Rod;
   16a) Bearings affixed to ends of fulcrum rod and attached to rear ends of forearm/hand bars;
117) Rotational Pumping Forearm Bars;
118) Hand grips attached to front ends of forearm/hand bars;
119) Forearm/Elbow Support Platforms;
   119a) Attachment mechanism that holds-in-place the rider's elbows and forearms to the upper side of the forearm holders;
120) Yoke connecting together the two forearm hand bars;
121) Rods connecting the yoke to the splitter and pinion gears;
   121a) Adjustment rod with attachment holes into which one attaches the front end of connecting rod 121b to adjust for the rider's desired leverage factor for exercising his arms;
   121b) Back and forth moving rod connected on its rear end to the splitter;
122) Rod guide that guides the rod as it travels back forth from the oscillating forearm bars;
123) Rod end bearing which is attached to the connecting rod and splitter;
   123a) Splitter that connects the racks to the connecting rod, and also keeps the inverted racks separated;
   123b) Lower housing that contains the 2 inverted racks, pinion gears, and one-way bearings that are powered from rotational oscillations of the rider's arms on the forearm bars;
124) First pinion gear
   124a) Rack support casing over which the rack slides and keeps the rack in contact with the first pinion gear;
   124b) One-way bearing located between the first pinion gear and the crank axle;
   124c) Rack that oscillates back and forth and whose teeth mesh into the teeth of first pinion gear, which is attached to the crank axle, and thereby rotates it;
125) Second pinion gear
   125a) Rack support casing over which the rack slides and keeps the rack in contact with the second pinion gear;
   125b) One-way bearing located between the second pinion gear and the crank axle;
   125c) Rack whose teeth mesh into the teeth of second pinion gear;
226) Upper housing containing two racks, two pinion gears, and two one-way bearings, an axle, and an upper rear chain sprocket;
227) Upper rear first rack that is in contact with the gear teeth on the top of the first pinion gear;
   227a) Upper rear second rack whose front end is connected to the back of the slider, and for which its teeth are meshed into the gear teeth on the underside of the second pinion gear;
228) First pinion gear located in upper housing;
   228a) Upper rear one-way bearing located in the upper housing between first pinion gear 228 and the upper rear axle 230;
229) Second pinion gear located in upper housing;
   229a) Upper rear one-way bearing located between second pinion gear 229 and axle 230;
230) Axle upon which the upper rear two pinion gears and one-way bearings rotate;
231) Bearings upon which the axle rotates within the upper rear housing opening;
232) Chain or belt that transfers torque from the upper rear sprocket to the lower sprocket that is attached to the crank axle;
233) Adjustable guide sprocket upon which the torque transferring chain is controlled;
234) Lower sprocket attached to the crank axle and upon which the chain (232) rotates;
235) One-way bearing located between the crank axle (15) and the lower sprocket 234, and allows for "On Demand" application by the rider to use of his sliding seat and torso to power the crank axle 15;
236) Stationary support bracket upon which the stationary sliding fixture is attached;
237) Fixture over which the slider slides back and forth from rider's use of his core muscles;
238) Slider to which the seat 4 is attached, and which slides back and forth over the stationary slider fixture (237) as a result of the rider moving his seat back and forth from use of his core, back, and shoulder muscle groups;
   238a) resistance device that engages to the stationary slider fixture (237) to increase resistance to sliding the slider (238) back and forth over the stationary slider fixture (237), requiring greater force to slide the slider back and forth over the stationary slider fixture (237);
   238b) resistance adjuster that rotates in one direction to increase engagement of the resistance device (238a) with the stationary slider fixture (237) and rotates in an opposite direction to decrease engagement of the resistance device (238a) with the stationary slider fixture (237);
239) Lever for use in locking the slider in a stationary position when the rider does not wish to engage the seat and torso sliding exercise;
240) Stationary Rollers which force the teeth of the rack to stay meshed into the teeth of the pinion gear when the rack is oscillating back and forth, and thus rotating the pinion gear; and
241) Upper rear chain or belt sprocket;
242) Crank axle sprocket that is attached to the crank axle, and transfers all of the torque available to the crank axle, from all three sources of potential exercise energy, into the chain and resistance flywheel;
243) Lower horizontal chain that connects the crank axle and its sprocket to the resistance wheel sprocket; and
244) Seat belts holding the rider in a stationary position as he slides his torso back and forth on the slider;
345) Electronic screen displaying virtual trek upon which the rider can exercise, contemporaneous bio marker readings from the rider, and modulation recommendations for energy (watts) output between the exerciser's arms and shoulders, legs, and core muscle groups;
346) Bio marker data bank storage and processor to calculate the rider's optimum amount of energy (Watts) that the exerciser should modulate between his arms and shoulders, legs, and core muscle groups; plus antennae for wireless radio transmission and receiving data;
347) Display control switch;
348) Circuit between the processor and unit display screen;
349) Example of bio marker sensor;
450) linear drive system;
451a) first set of inversely positioned racks;

451b) second set of inversely positioned racks;
453a and 453b) foot platforms;
456a and 456b) set of pinion gears;
457a and 457b) set of pinion gears;
458a and 458b) set of one-way bearings coupled to each of the pinion gears.

DETAILED DESCRIPTION OF EMBODIMENTS OF THE INVENTION

In the following description and accompanying drawings, like numbers refer to like parts whenever they occur. In addition, while the following enablement refers to many component parts of the invention operating at specific positions within the overall Tri-Power exercising system, some of these parts may be shifted to different locations within the overall Tri-Power drive system and still maintain complete functionality. An example of this is the one-way bearing for use by the "On Demand" sliding seat which is currently located between the crank axle and chain sprocket, this one-way bearing could be moved to being located between the upper rear axle and its sprocket, and the invention would still operate perfectly fine.

Enablement Applicable to Tri-Power Spin and Exercise Bicycle

The purpose of Tri-Power stationary exercise bike 1 is to provide the single most efficient exercise device available to people that want to be completely physically fit, healthy, and exercise their legs, arms and shoulders, and core muscle groups simultaneously at the same time. Alternatively, riders can exercise their leg, arm and shoulder, or core muscle groups individually, or in any combination, whatever they choose. The Tri-Power Exerciser helps riders build muscle mass in their arms and shoulders and core muscle groups, while at the same time reducing the time required to satisfy their cardio, vascular, and respiratory requirements. The Tri-Power Exerciser accomplishes these objectives by inputting power into rotating the crank axle 15, from simultaneously exercising virtually all of the muscles throughout their upper, middle, and lower body. For riders to engage in a Tri-Power exercise activity they complete the following steps: a) check the position of the leverage connecting rods 121a and 121b, and adjust them 121a and 121b to whatever level of resistance they wish to engage their arms and shoulders during their exercise ride (See FIG. 1) b) place their seat onto saddle 4 of the stationary bike 1, c) then fasten themselves onto the saddle 4 by fastening safety belt 244 into its locking receptacle (See FIGS. 1 and 5) d) riders then place their elbows and forearms onto the two platforms 119, fasten them into place with the attachment mechanism 119a, and grasp the hand grips 118 with their hands, (See FIGS. 1 and 8) and d) then they place their feet onto the pedals 10 and 12. (See FIG. 1) Once riders are ready, then they commence their Tri-Power exercise activity by, either simultaneously or "On Demand": a) using their core and back muscle groups to pull forward and push backward saddle 4 and slider 238 in an oscillating manner over stationary sliding fixture 237, b) pulling-up and pushing-down with their arms in continuous power strokes on the forearm bars 117 in a rotational arc, and rotating their legs on the pedals 10 and 12. (See FIGS. 1, 5, and 6) All three of these exercising functions input torque into the crank axle 15, and they can be engaged simultaneously or "On Demand" in any combination of these 3 exercise functions. This means riders can engage just one, two, or three of these exercising activities whenever they choose. In addition, riders can choose whatever length of movement of their forearm bars 117 or sliding saddle 4 and slider 238, they are able to perform. If they engage all three exercising activities simultaneously, then the rate of movement of them must be synchronized together; alternatively, whichever exercise activity, legs, arms, or core, is rotating the crank axle 15 with the most RPM is the dominant exercise activity. This capability of "On Demand" power for each of the three exercise activities is a result of placing one-way bearings 124b, 125b, 235, and 8a, in each of the three Tri-Power drive trains at an appropriate location, such as those shown in FIGS. 7 and 1.

Drive Train System 100 for Forearm Muscle Induced Power

The Upper Front Drive System operates by riders placing their elbows and forearms onto the two platforms 119 and grasping hand grips 118 with their hands. Alternatively, if the platforms 119 have bindings 119a with which to fasten their elbows and forearms into the platforms 119, riders attach their elbows and forearms into the bindings 119a and fastener bindings 119a into the holes in platform 119, riders then grasp their hand grips 118. Then they commence pulling-up and pushing-down on the forearm bars 117 in a rotational arc to power crank axle 15, always using power strokes. There are two purposes for having riders use the platform bindings 119a to operatively fasten their elbows into the fastening holes in the platforms 119, and these purposes are: a) to keep the rider's elbows and forearms fastened onto the platforms 119 and prevent them from rising-up off the platforms 119 during powerful down strokes with their forearm bars 117, and b) to provide riders with a stationary reference point 119 and 119a from which they can slide their saddle 4 back and forth. Riders slide their seat 4 and torso back and forth by using their biceps, shoulders, and core muscles to push and pull the slider 238 over the stationary slider fixture 237. Torque is also created when riders' forearm bars 117 move up and down at a rate that is as fast or faster than riders are pedaling the crank axle 15 from either: a) pumping the pedals 10 and 12 with their legs, or b) sliding their saddle 4 and slider 238 over the slider's stationary fixture 237.

The fulcrum rod 116 has on each end a bearing 116a, and attached to each of these bearings 116a is the rear end of one of two forearm bars 117. Thus, as riders pull-up and push-down on the front of forearm bars 117, the rear end of each of these forearm bars 117 pivots on fulcrum rod 116 and bearings 116a, causing a cyclical angular displacement of forearm bars 117 as they move lineally along the path of an arc. (See FIG. 1).

Figure 2:
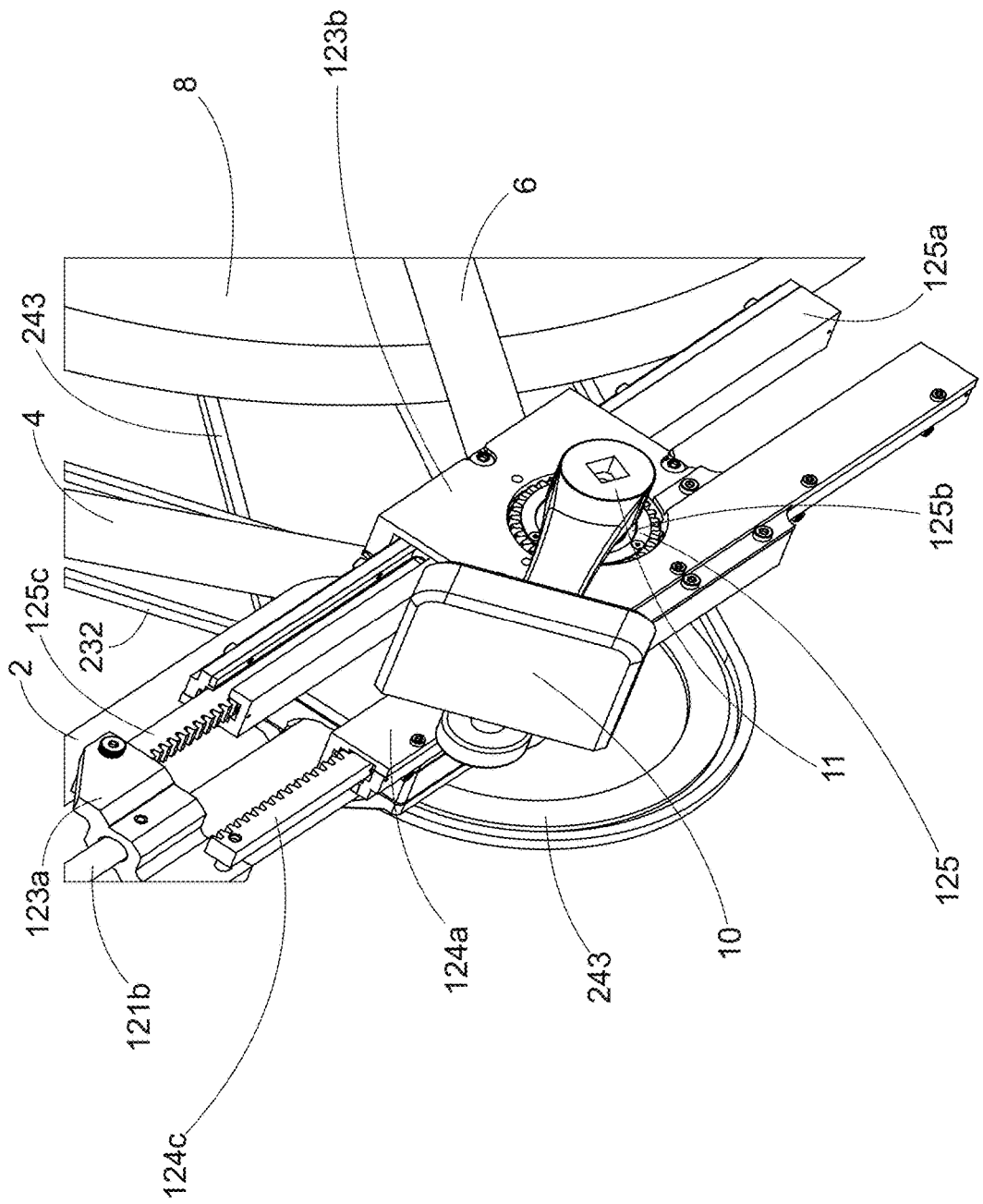
FIG. 2 is an oblique close-up view of the connection of the connecting rod to the splitter, the two inverted racks, the roller sets that hold the racks onto their respective pinion gears, the two pinion gears, the two one-way bearings (not shown), and the crank axle upon which the pinion gears and their respective one-way bearings are attached (not shown)
Figure 3:
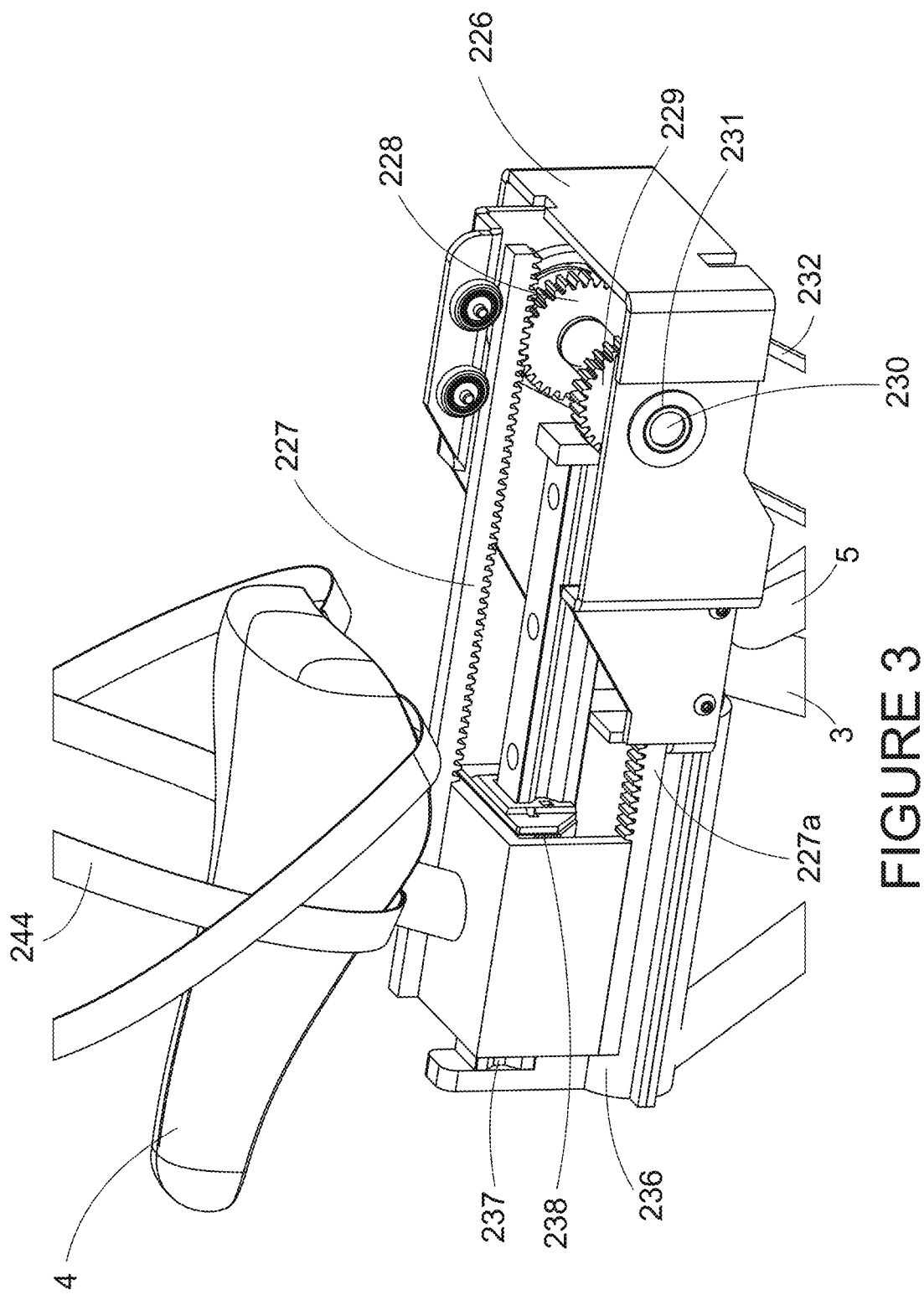
FIG. 3 is an oblique view of the seat belts that go around the rider's core and keep him affixed to the seat as it slides back and forth over the slider, the upper rear housing located behind the rider's sliding seat, slider upon which the seat slides, fixture to which the slider is attached, two inverted racks attached to the slider on their front end, two pinion gears (showing one) over which the racks travel, bearings in the housing upon which the pinion gear's axle rotates, and rollers that guide the racks and teeth of such inverted racks which are meshed into the teeth of their respective pinion gear.

The forearm bars 117 are connected together through a yoke 120 that is located between both forearm bars 117. Because they 117 are fastened together 117, the two forearm bars 117 can only move rotationally together 117 in an arc up and down, which creates and delivers torque to the crank axle 15. (See FIGS. 1 and 2). Attached to the yoke 120 are two levering connecting rods 121a and 121b. Riders can adjust the amount of resistance that will occur with their forearm oscillations by selecting the specific hole in leverage rod 121a into which they will attach connecting rod 121b. To increase their forearm bar 117 leverage, the connecting rod 121 will be attached into the hole that is positioned highest on leverage bracket 121a, and vice versa for having the least amount of leverage.

Attached to the rear end of connecting rod 121b, which protrudes diagonally down and toward the rear of the exerciser, is a splitter 123a. Splitter 123a has attached to it two inverted racks 124c and 125c. The inverted racks 124c and 125c move in and out of lower housing 123b, while they rotate their respective two pinion gears 124 and 125 within housing 123b. However, each inverted rack 124c and 125c rotates its respective pinion gear 124 and 125 in the opposite direction, one from the other 124 and 125, respectively. The two racks 124c and 125c accomplish this phenomenon by being inverted. Rack 124c positioned on the bottom of pinion gear 124. The second rack, 125c, is then positioned on the top of its pinion gear 125. Positioned between each pinion gear 124 and 125, and crank axle 15, are 2 one-way bearings 124b and 125b respectively. The interior race of each one-way bearing, 124b and 125b respectively, is attached to the crank axle 15. (See FIGS. 1 and 2) The current design illustrated by the attached Drawings and Enablement herein, are examples of the use of rack support casings to support racks 124c and 125c as they travel over the pinion gears. Other rack support designs, such as wheels located on the non-gear side of the racks, can be used to support the racks as they push/pull and rotate their respective pinion gears.

Thus, as the rider rotationally pumps forearm bars 117 up and down, the yoke 120 operatively pulls connecting rods 121a and 121b back and forth in a diagonal plane. Connecting rod 121b then pulls the splitter 123a back and forth, which contemporaneously moves racks 124c and 125c back and forth over their respective pinion gears 124 and 125. (See FIGS. 1, 2, and 7) Because the teeth of each rack, 124c and 125c, are meshed together respectively with the teeth of their respective pinion gears 124 and 125, each of these pinion gears 124 and 125 simultaneously rotates back and forth. Because pinion gears 124 and 125 are rotating upon one-way bearings 124b and 125b, which are affixed to crank axle 15, the back and forth rotation of pinion gears 124 and 125, along with their respective one-way bearings 124b and 125b, cause crank axle 15 to also rotate. However, because racks 124c and 125c are installed over their respective pinion gears 124 and 125 inversely, the teeth of one, for example 125c, are engaged with and moving the top positioned teeth of its pinion gear 125. The teeth of the other rack 124c are engaged with and moving the bottom positioned teeth of its pinion gear 124. This causes each pinion gear 124 and 125, and respective one-way bearings 124b and 125b, to rotate in opposite directions, while the crank axle 15 always rotates in the direction that propels the bicycle forward. This is because the one-way bearings 124b and 125b, which are attached to each pinion gear 124 and 125, are also operating in a rotational direction opposite one from the other. Thus when the cogs of one of the one-way bearings are engaged, the cogs in the other one-way bearing are not engaged. Because these one-way bearings 124b and 125b are attached directly onto crank axle 15, and one of the one of the one-way bearings 124b or 125b is engaged while the other 124b or 125b is free-floating, this causes the torque from the engaged one-way bearing 124b or 125b to be transferred into the crank axle 15 and rotate it 15 in a forward direction, adding additional torque to the resistance flywheel 8. (See FIGS. 1, 2, and 7)

When riders reverse their direction of travel of the forearm bars 117 in the oscillation cycle, this causes the connecting rod 121 to simultaneously reverse its direction of travel, and the process starts all over again. However, as the drive train reverses its direction of travel, the pinion gear 125, and one-way bearing 125b, which were previously not engaged, now become the sole means for providing torque into the crank axle 15 from rotational pumping of the forearm bars 117 by riders. (See FIGS. 1, 2, and 7)

Figure 10A:
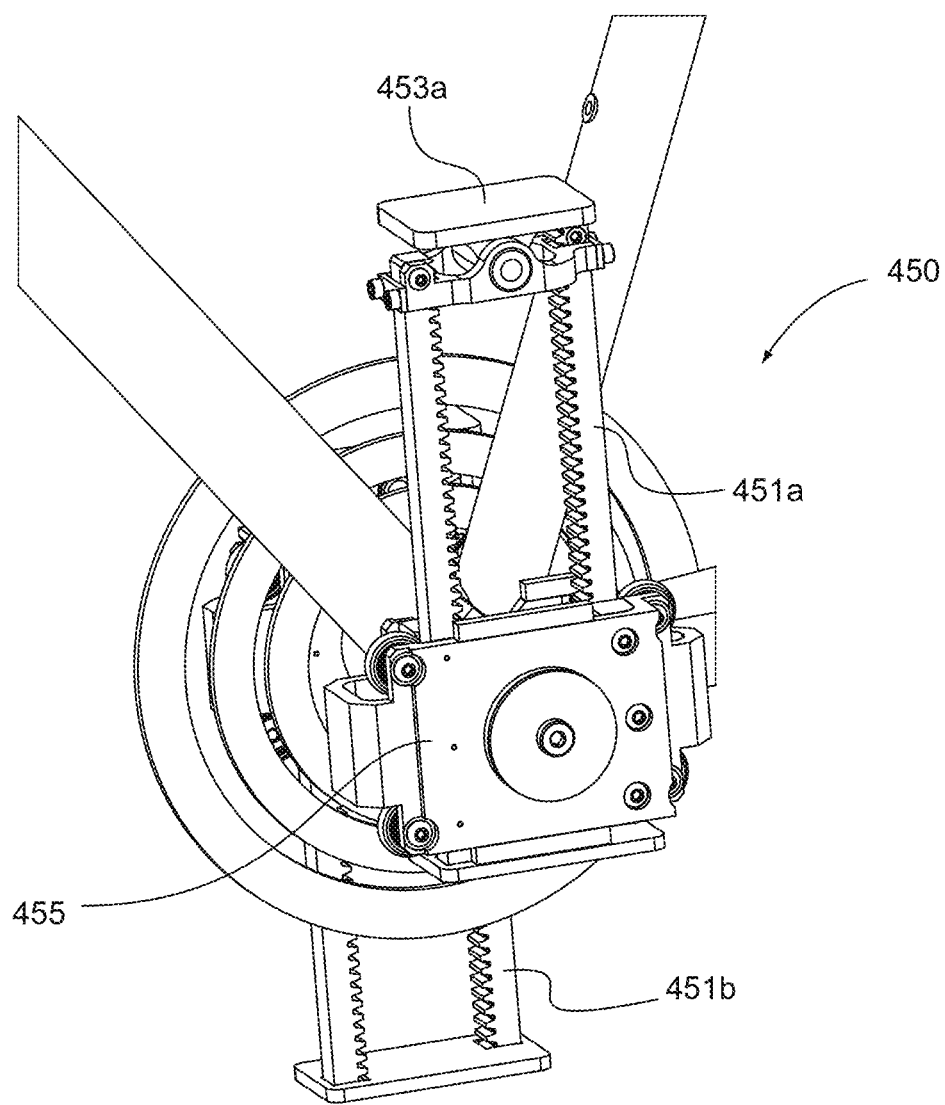
FIG. 10A is a perspective view of a linear drive system that supplies power to the crank axle.
Figure 10B:
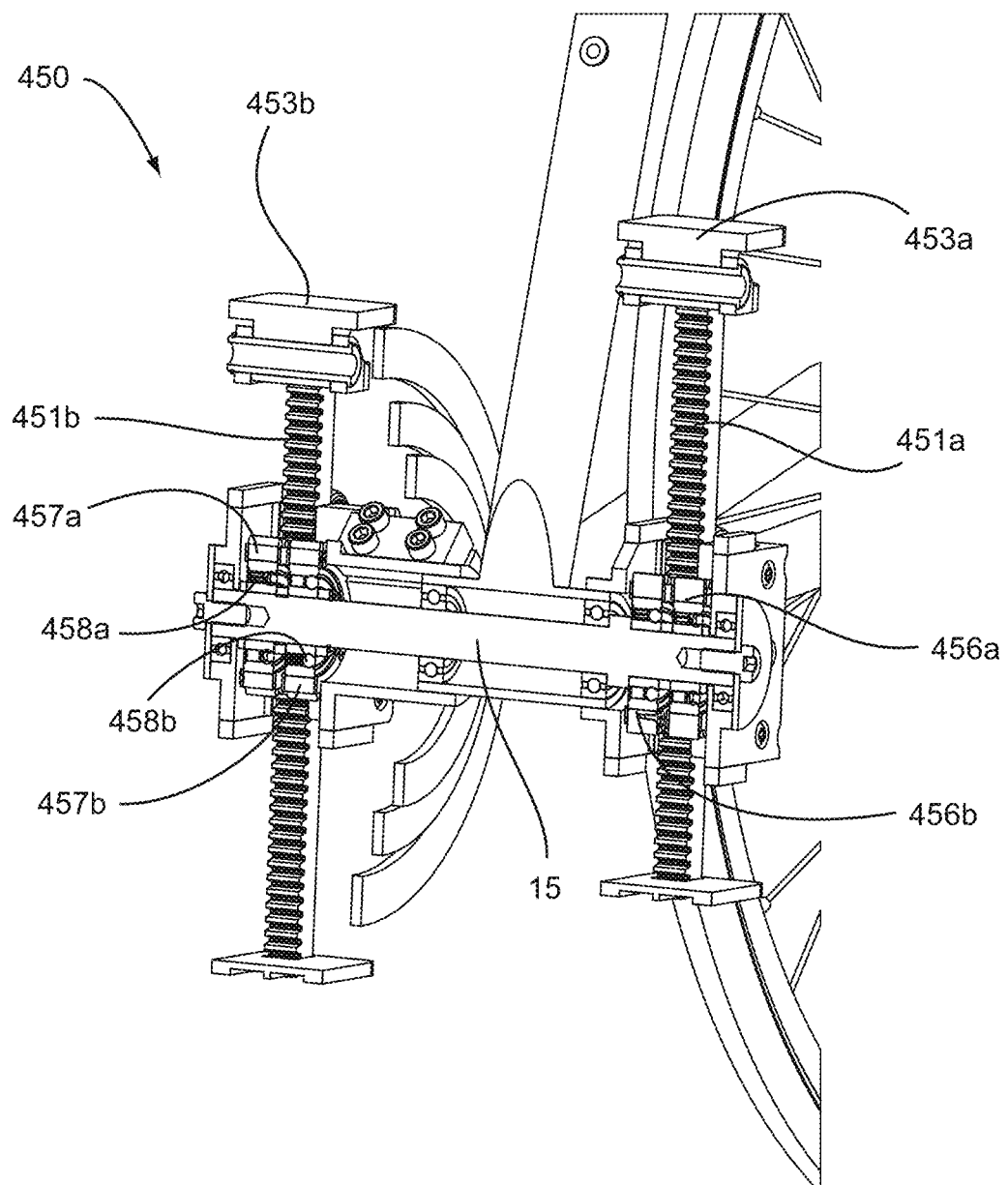
FIG. 10B is a cut-a-way view of a linear drive system that supplies power to the crank axle.

The foregoing described system for arm locomotion of a bicycle and its crank axle consisting of inverted racks, pinion gears, and one-way bearings can also be used independently as the primary source of power to rotate the crank axle from power inputted by the rider's legs. In this application, the rider would place the bottom of his shoes into clips, or onto the top of platform pedals 453a and 453b, which are located on the upper end of each rack (See FIGS. 10A and 10B). Riders then push down and pull up on the upper end of the racks 451a and 451b, which up and down leg action will rotate the crank axle 15. Further, the forearm bars 117 constitute one type of arm exercise apparatus. Arm exercise apparatus includes, but is not limited to, an arm exercise apparatus, an arm and shoulder exercise apparatus, and/or a shoulder exercise apparatus.

While it is shown that the Upper Front Drive System that includes the forearm bars 117 are operatively coupled to the crank axle, other embodiments may include portable forearm bars that are not connected to the crank axle. These portable forearm bars may be mounted to existing bicycles and exercise bikes, wherein the portable forearm bars include their own adjustable resistance mechanism. This allows a rider to add a workout to upper body muscle groups using existing bicycles or exercise bikes.

Drive Train System 200 for Core Muscle Induced Power

When riders exercise their core muscle tissue, they engage Drive Train System 200. Riders first mount the exercise bicycle 1, and place their seat into saddle 4. Then they fasten their forearms and elbows into forearm bindings 119a, and affix them 119a into platforms 119. (See FIGS. 1 and 8) Riders then grasp hand grips 118 with their hands. Next, while using muscle tissue in their core, biceps, and shoulders, they commence pulling their seat, saddle 4, and torso forward on slider 238. The saddle 4, which is attached to slider 238, reacts by sliding the rider forward in the direction of the stationary positioned platforms 119 and the bindings 119a fastened into these platforms 119. Once riders have pulled their torso and core sufficiently close to the platforms 119, they reverse their core muscle exercise direction, and again, using their core muscle tissue plus forearms, biceps, and shoulders, they push and slide their seat, saddle 4, and slider 238 backward, away from the stationary platforms 119. The exerciser's torso is now sliding on slider 238 backward over sliding fixture 237. To continue and complete the rider's core muscle group exercise program, the rider continues oscillating his torso and the slider 238 over the sliding fixture 237 until the exerciser's bio metric levels have reached the desired level of exercise activity.

Figure 5:
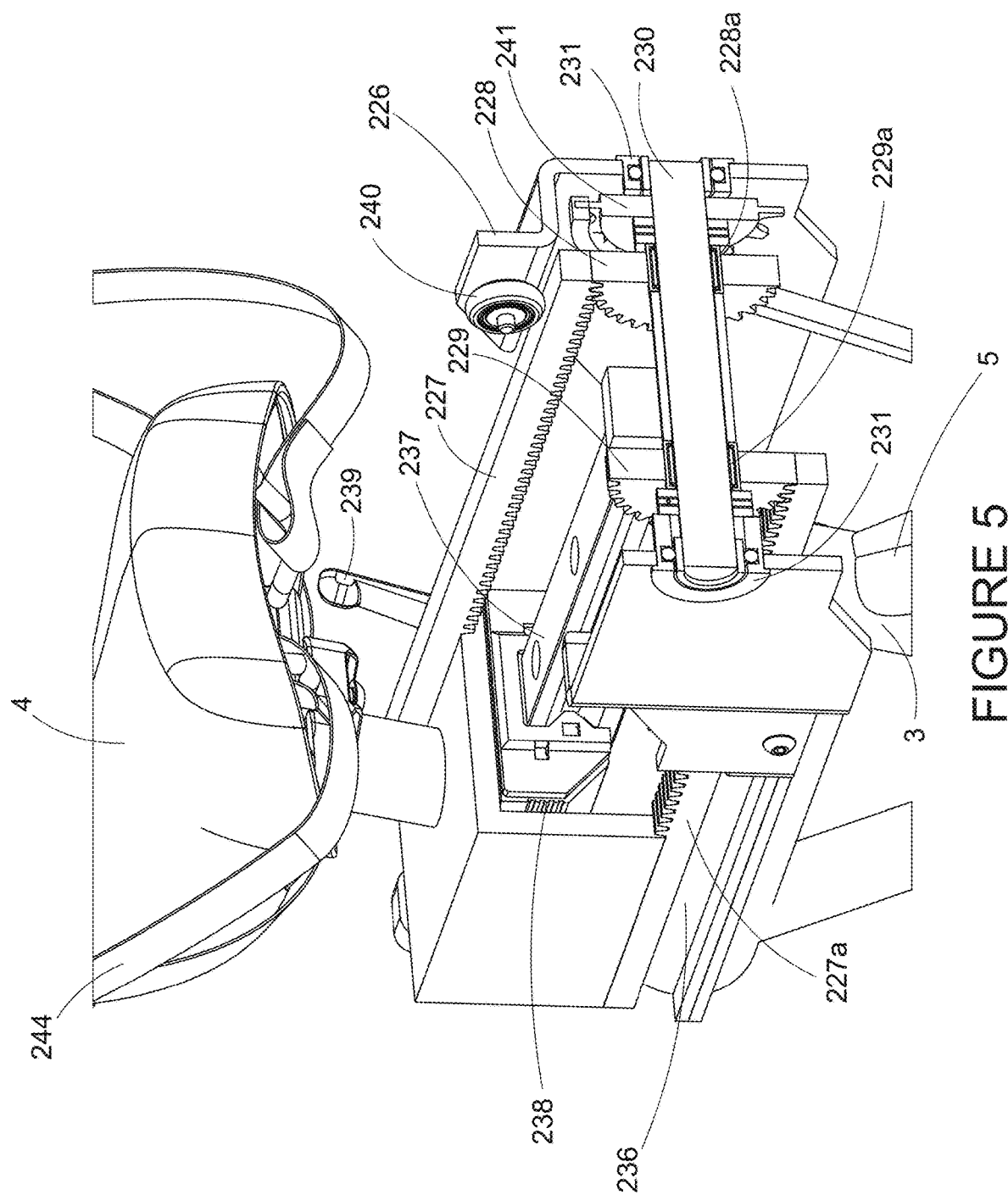
FIG. 5 is a cut-a-way view of the upper rear housing and attendant parts including: inverted racks, rollers that hold the racks onto their respective pinion gears, bearings upon which the axle rotates, two one-way bearings, bearings over which the upper rear housing axle rotates, upper rear sprocket, seat, slider and locking mechanism, slider rail over which the slider moves back and forth, fixture attached to the frame and slider rail, and chain that transfers torque from the sprocket of this upper rear housing to the crank axle sprocket.
Figure 6:
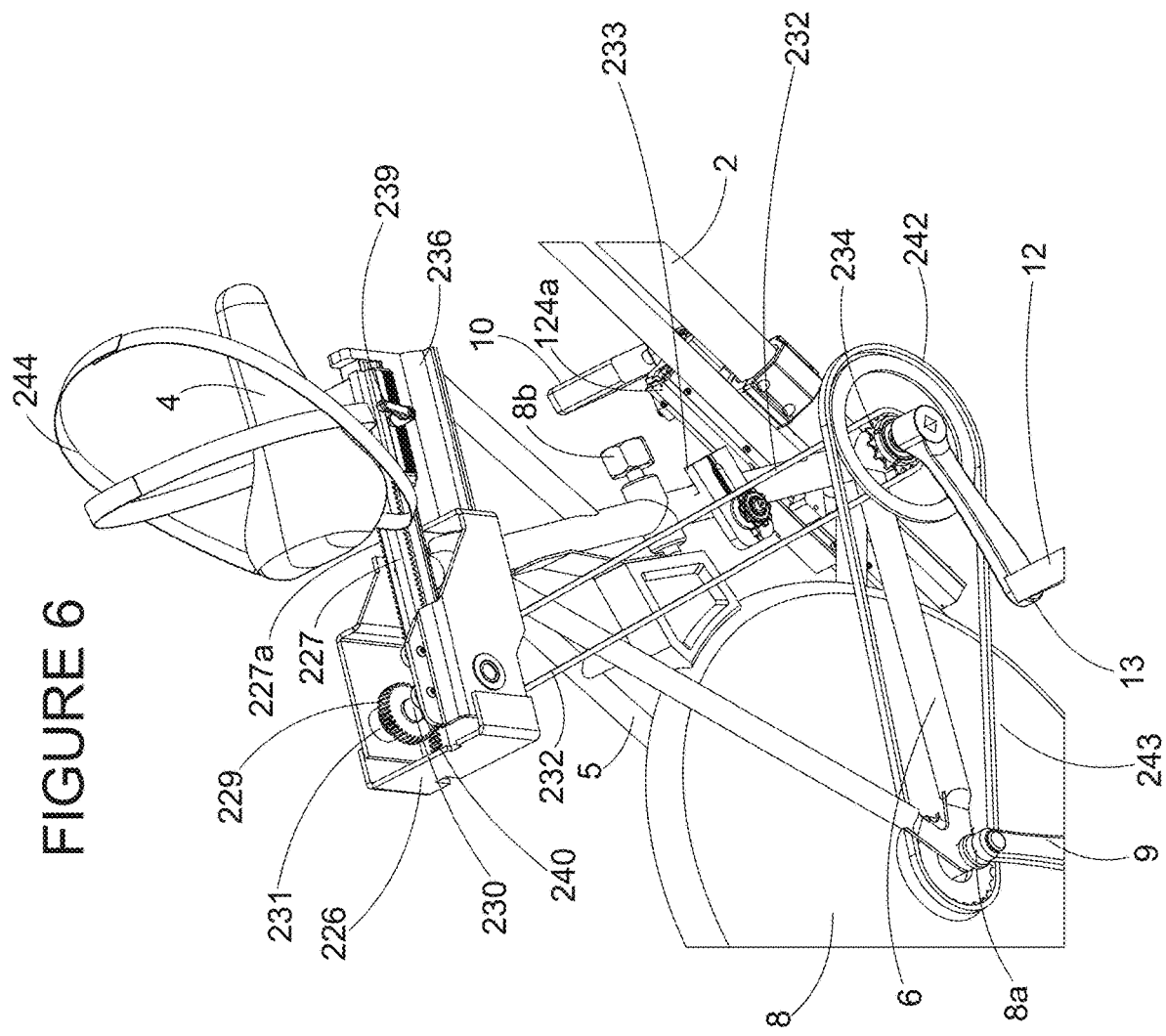
FIG. 6 is an oblique view of the same parts that are shown in FIG. 5, but it has the following additional parts: chain meshed into both: a) the teeth of the upper rear housing sprocket, b) the teeth of the lower sprocket, and such sprocket being attached onto the crank axle; and a chain adjustment mechanism located between both of these sprockets.
Figure 7:
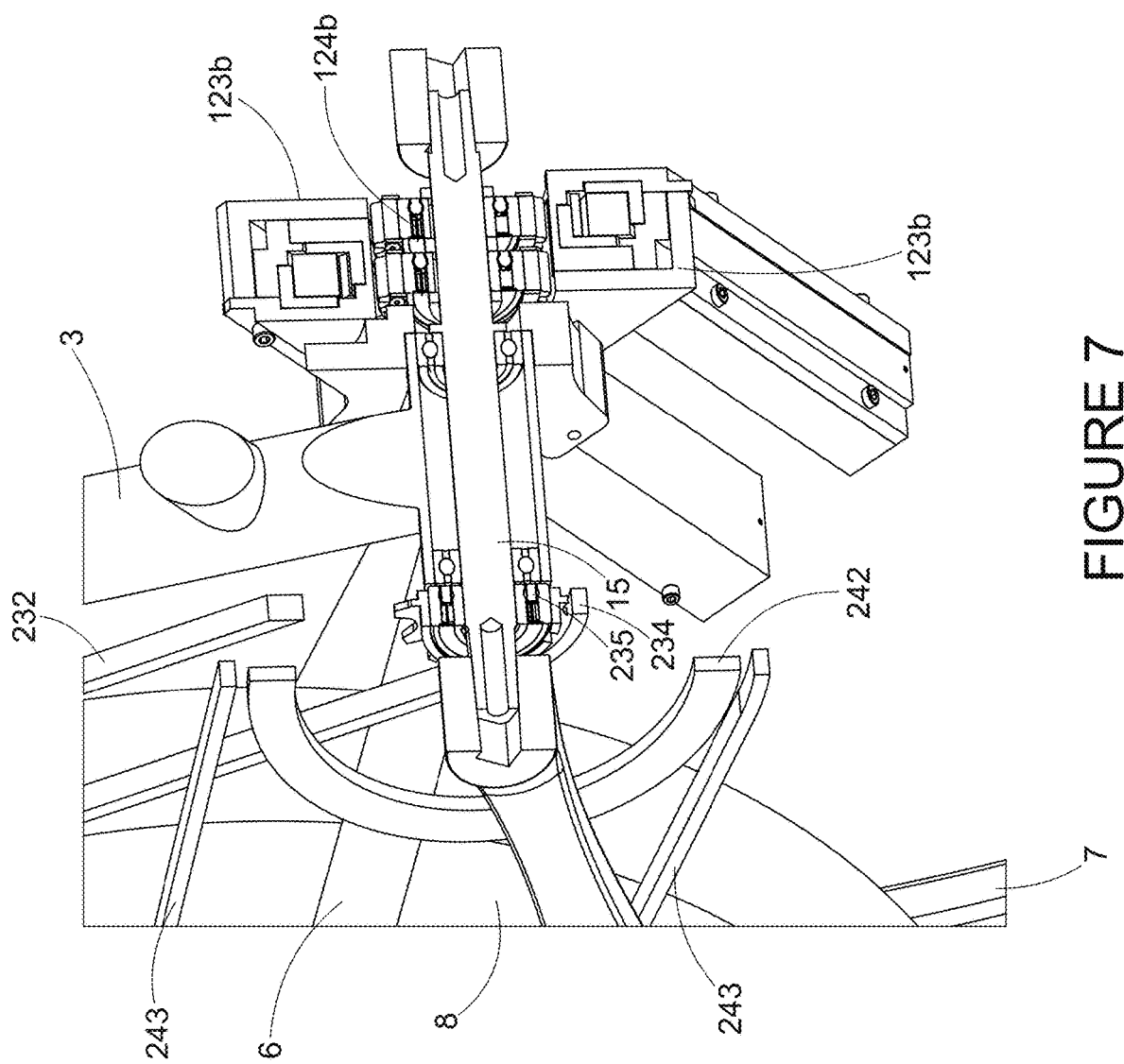
FIG. 7 is a cut-a-way view of the intersection containing the parts where all three power-creating functions come together on the single crank axle. These three power functions are: a) rotational pedaling of cranks from the rider's legs, b) oscillations from the forearm bars moving the inverted racks back and forth, and c) the back and forth oscillating sliding seat and slider operatively rotating the upper rear chain sprocket and chain, which in turn rotates its corresponding lower rear sprocket that is connected to this same crank axle.

Resistance is provided to the rider's core muscle tissue because component parts of Drive Train 200 operate in the following way:

a. The slider 238 and saddle 4 are attached to two inverted racks 227 and 227a. These racks 227 and 227a are positioned inside an upper rear housing 226, located behind the saddle 4 and slider 238;

b. The teeth of racks 227 and 227a are positioned such that they inversely mesh into the teeth of 2 pinion gears 228 and 229, as shown in FIGS. 5 and 6;

c. As the rider slides his saddle 4 and seat forward and backward, these 2 inversely positioned racks 227 and 227a cause the pinion gears 228 and 229 to rotate in opposite directions, one from the other (See FIGS. 5 and 6);

d. Each of these pinion gears 228 and 229 are operatively connected to the axle 230 by being attached to one-way bearings 228a and 229a, respectively;

e. In the condition in which rack 227a is being pushed backward over the bottom of the teeth of pinion gear 229, this causes its pinion gear 229 and one-way bearing 229a to rotate in the direction in which the crank axle 15 will be provided torque from them.

Figure 4:
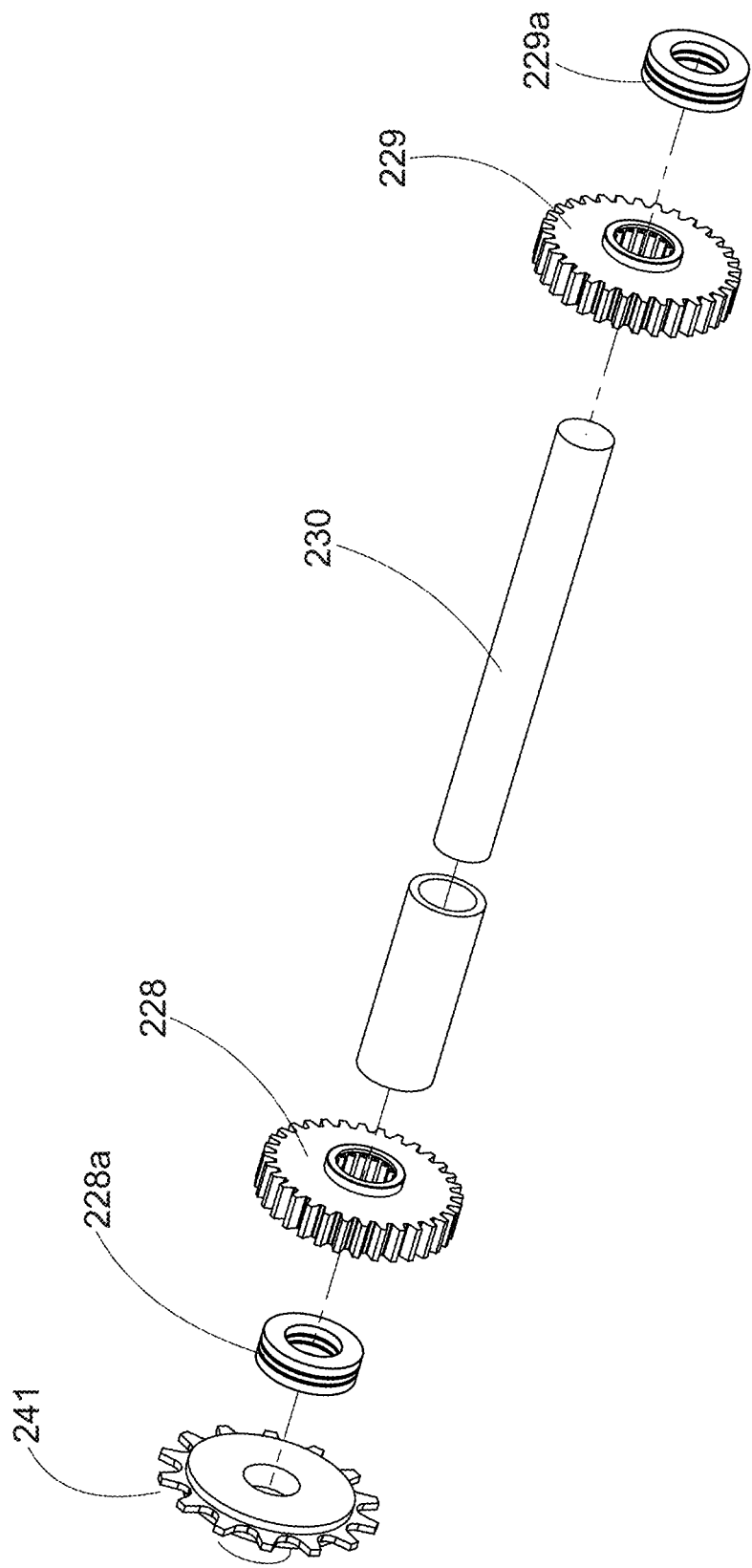
FIG. 4 is a cut-a-way view of the upper rear housing's axle, pinion gears, one-way bearings, and upper rear chain sprocket.

Conversely, and simultaneously, while inversely mounted rack 227 will also be pushing on the top of the teeth of its pinion gear 228, this pinion gear 228 and its one-way bearing 228a, will be rotating in the opposite direction from that of pinion gear 229 and its one-way bearing 229a. Further, when pushed forward, rack 227 and its pinion gear 228 supply torque to the axle 230 and thereby to the crank axle 15, while rack 227a and its pinion gear 229 freely rotate. Thus, the cogs of one of the one-way bearings are engaged while the others are free-floating, and this causes axle 230 to rotate from torque provided by the pinion gear 228 or 229 whose one-way bearing 228a or 229a is engaged and transferring torque into axle 230;

f. A sprocket 241 is attached to one end of axle 230 (See FIGS. 4 and 5). Sprocket 241 has a chain 232 meshed into its teeth 241, and this chain 232 transfers torque from the rotation of axle 230 down to the sprocket 234; (See FIGS. 4,5,6, and 7)

g. Sprocket 234 is attached to crank axle 15, and thus causes the rotation of crank axle 15 (See FIG. 7);

h. Because crank axle 15 is attached to chain sprocket 242, and sprocket 242 powers horizontal chain 243 to drive the resistance flywheel 8, the power generated from the rider using his core muscles to push, pull, and slide himself back and forth on his slider 238 has created and transferred torque that operatively rotates the resistance flywheel 8 (See FIGS. 1,2,5,6, and 7).

While it is shown that the core muscle drive train includes the sliding seat operatively coupled to the crank axle, other embodiments may include a portable sliding seat that is not connected to the crank axle. An example is depicted in FIGS. 11A and 11B. Embodiments include a portable sliding seat that may be mounted to a post 3 that can be inserted into existing post tubes 3 of existing bicycles and exercise bikes, wherein the portable sliding seat 4 includes its own adjustable resistance mechanism (See FIGS. 11A and 11B). Riders first mount the exercise bicycle 1, and place their seat into saddle 4. Then they fasten their forearms and elbows into forearm bindings 119a, and affix them 119a into platforms 119. (See FIGS. 1 and 8) Riders then grasp hand grips 118 with their hands. Next, while using muscle tissue in their core, biceps, and shoulders, they commence pulling their seat, saddle 4, and torso forward on slider 238. The saddle 4, which is attached to slider 238, reacts by sliding the rider forward in the direction of the stationary positioned platforms 119 and the bindings 119a fastened into these platforms 119. Once riders have pulled their torso and core sufficiently close to the platforms 119, they reverse their core muscle exercise direction, and again, using their core muscle tissue plus forearms, biceps, and shoulders, they push and slide their seat, saddle 4, and slider 238 backward, away from the stationary platforms 119. The exerciser's torso is now sliding on slider 238 backward over sliding fixture 237. To continue and complete the rider's core muscle group exercise program, the rider continues oscillating his torso and the slider 238 over the sliding fixture 237 until the exerciser's bio metric levels have reached the desired level of exercise activity.

Resistance is provided to the rider's core muscle tissue by operation of an independent adjustable resistance mechanism that includes a resistance device 238a and a resistance adjuster 238b. The resistance device 238a engages to the stationary slider fixture 237 to increase resistance to sliding of the slider 238 back and forth over the sliding fixture 237. The increased resistance thereby requires greater force to slide the slider 238 back and forth over the stationary slider fixture 237. The resistance adjuster 238b is rotatably coupled to the slider 238, for example, but not limited to the resistance adjuster 238b may include a threaded shaft that engages a threaded hole in the slider 238. The resistance adjuster 238b engages the resistance device 238 and upon rotation of the resistance adjuster 238b in a first direction, the engagement of the resistance device 238a with the stationary slider fixture 237 is increased to increase resistance and rotation of the resistance adjuster 238b in a second direction, opposite the first direction, decreases engagement of the resistance device 238a with the stationary slider fixture 237 to decrease resistance. This allows for the adjustment of the rider to his or her specific fitness levels and core workout desired.

Drive Train System 100 for Leg Muscle Induced Power

The drive train for exercising the rider's legs are just like he would perform in riding a regular exercise bike 1. He would: a) mount the bike 1 and position his seat in saddle 4, b) position his feet on the pedals 10 and 12, c) and begin pedaling in a typical circular manner or vertically in a linear manner. The rider will then be exercising many different muscle groups in his lower body from his thighs to his feet.

The use of rotating pedals is an example of how a rider can use his legs to power the crank axle 15. However, another method for riders to cause their legs to rotate the crank axle 15 is to use components of the current invention, racks 451a and 451b, pinion gears 457a and 457b, and one-way bearings, to rotate the crank axle 15. With this methodology, riders would simply place their right foot onto the top end of the right rack 453b, and their left foot on top of the left rack 453a. Then, in the same way that a rider's forearm bar 117 operatively pushes down and pulls up the upper end of its racks 124c and 125c, the rider's foot will likewise serve the same function of operatively pushing-down and pulling-up on its rack 451a and 451b, and cause the respective pinion gear 457a and 457b and one-way bearing 458a and 458b to power and rotate the crank axle 15. This rotation of the crank axle 15 will in turn cause rotation of the crank axle's sprocket 242 and chain 243, which is connected to the resistance flywheel 8, and thereby rotate it.

In some embodiments, the drive train for exercising the rider's legs include a linear drive system 450. The linear drive system 450 includes a first set of inversely positioned racks 451a on one side of the exercise bike 1 and a second set of inversely positioned racks 451b on the second side of the exercise bike 1. As the rider uses his legs and feet to push down and or pull up on foot platforms 453a and 453b, the first set and second set of inversed racks 451a and 45 1b move back and forth over their respective pinion gears 456a, 456b and 457a, 457b. Because the teeth of each set of inversed racks, 451a and 451b are meshed together respectively with the teeth of their respective pinion gears 456a, 456b and 457a, 457b, each of these pinion gears 456a, 456b and 457a, 457b simultaneously rotates back and forth. Because pinion gears 456a, 456b and 457a, 457b are rotating upon one-way bearings 458a and 458b, which are affixed to crank axle 15, the back and forth rotation of pinion gears 456a, 456b and 457a, 457b, along with their respective one-way bearings 458a and 458b, cause crank axle 15 to also rotate. The pinion gears 456a, 456b and 457a, 457b are positioned to rotate in the crank axle 15 in a single direction and further are positioned such that pushing down on foot platform 453a lifts foot platform 453b and pushing down on foot platform 453b lifts foot platform 453a. This operation allows a rider to supply power to the crank axle with the rider's legs using a linear drive 450 as opposed to using rotating pedals.

Components of Drive Train System 100 that are Only Used with Leg Muscle Induced Tri-Power Exercising The Tri-Power drive train allows riders to simultaneously combine exercising muscle groups from virtually all muscle groups in their body which include: a) hands, arms and shoulders, b) core which comprises their abdomen and back, and c) legs and thighs. In addition, riders can select any individual muscle group, or sequence of them, that they wish to exercise individually or in combination one with the other. For example, riders can exercise just their legs, or only their arms and shoulders, or their core muscle groups by themselves. On the other hand, they can combine muscle groups and simultaneously exercise a variety of them together. For example, they can exercise together their legs plus arm and shoulder muscles; or they can choose their arms and shoulders and core muscle groups. Other muscle group combinations are also available, which ever combination the rider wishes to use.

This flexibility for selectively exercising multiple muscle groups "on demand", and having the amount of energy being exerted from all three sources at the same time is the result of two primary separate facets to the Tri-Power exercise bike. They are: a) a separate one-way bearing is positioned in each of the three different drive trains, and b) all of the energy being exerted by the rider is channeled into the crank axle 15, and operatively into the resistance flywheel 8. Thus, the rider's dialed-in resistance from flywheel 8 is applicable at the same time to each of the three muscle groups which the rider is exercising.

However, in the instance in which the Tri-power Bike is using the resistance based sliding seat shown in FIGS. 11A and 11B, the rider's seat 4 movement resistance may be less or more than that defined by resistance of the flywheel 8.

Modulation Recommendation

Figure 9A:
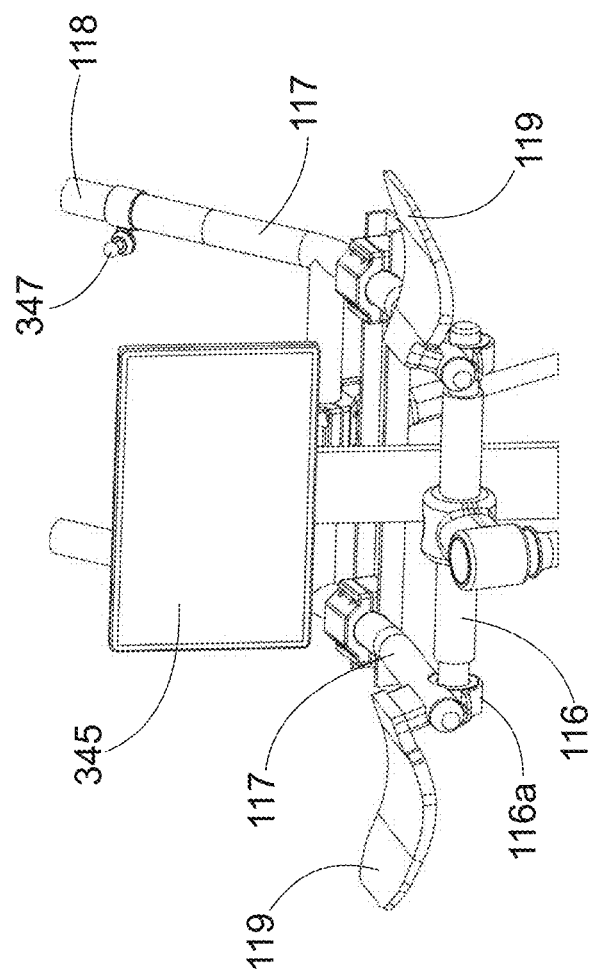
FIG. 9A is a view of the rider's electronic screen. It broadcasts the rider's virtual riding experience on a particular trek, bio marker data showing his level of physiologic condition at any given point on the trek, and recommended energy output modulation between the exerciser's oscillating arms and shoulders, legs, and core muscle groups.
Figure 9B:
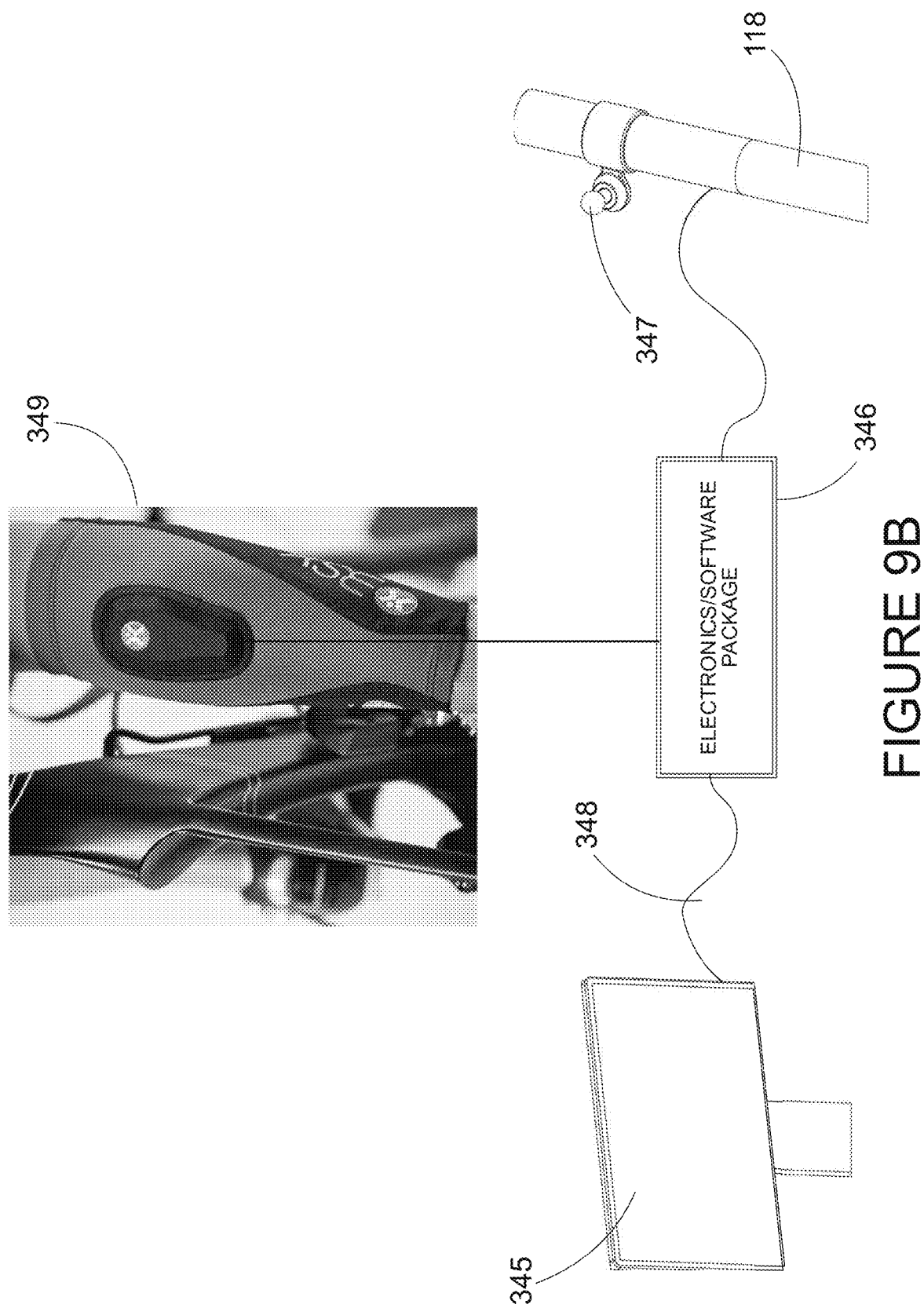
FIG. 9B is a schematic showing an example of a bio marker sensor that gathers the bio level data from the rider's physiologic condition, processor that holds the bio marker data library and processes the new bio marker data as it is read contemporaneously from the rider, and display screen that broadcasts to the rider the bio marker data processing results and recommended modulation of energy (watts) output that the rider should implement between his arms and shoulders, legs, and core muscle groups to optimize his exercise experience for this activity.

FIGS. 9A-9B depict a compilation of equipment that receives, transmits, and processes data. Electronic screen 345 operates to display a virtual trek upon which the rider can exercise, contemporaneous bio marker readings from a bio marker sensor 349 coupled to the rider are collected and transmitted to a bio marker data bank storage 346 having a processor. In some embodiments, the bio marker data bank storage 346 is a computing device. A connection that may include a circuit 348 may be established between the data-bank storage 346 and the display 345 allowing the data bank storage 346 to process data and send instruction to the display to display certain information through a user interface viewable on the display. A display control switch 347 may also be coupled to the forearm bars 117 at a location where the rider can access it with his hand while utilizing the forearm bars 117. The display control switch 347 allows a user to control the user interface on the display 345 using a wireless connection between the display control switch 347 and the display 345 to control the operation of the display 345 and the operating user interface. The system operates to calculate the rider's optimum amount of energy (Watts) that the exerciser should modulate between his arms and shoulders, legs, and core muscle groups; plus antennae for wireless radio transmission and receiving data, and modulation recommendations for energy (watts) output between the exerciser's arms and shoulders, legs, and core muscle groups, as requested by the exerciser at any given point on the trek. The incremental differential between the total number of watts created when the rider uses both his arms and legs to power the bike as opposed to just his legs is approximately sixteen percent (16%). This example, from one specific rider, represents one of the classifications of data which the computing device can use in calculating the number of watts the rider should be delivering into the driving wheel from muscle groups in only his legs, or simultaneously in both his arms and legs together to optimize the cyclist's best exercise performance. This may be utilized for the rider to pass other riders depicted in the virtual trek displayed on electronic display 345.

The computing device 346 may include, but is not limited to: a radio to receive and transmit data, data storage system, and processor to process such stored and newly received data within the data storage system. The computing device 346 will perform various functions including, but not limited to the following: 1) store, in a biologic, geographic, and watt output database, a library of historical biologic metrics, geographic, and watt output information for a particular exerciser or exercisers developed during prior exercising activities; 2) Store other biologic data regarding the specific exerciser gathered from the riders' prior physical exercising activities; this biologic data can include, but is not limited to: heart rate, blood pressure, oxygen uptake capacity, red blood cell count, lactate clearance and threshold, and oxygenation condition; 3) Store the geographic characteristics of prior and current treks which include for example: total elevation, number of hills, their grade and length, total surface distance of the treks, and location of the rider on the trek at specific times when asking the processor to make its muscle group modulation recommendations; 4) store the watt readings associated with each biomarker reading; 5) utilizing historical bio-marker, geographic, and relevant watt data, the processor will calculate and establish a base line of optimum watt output levels for the exerciser's various classes of muscle groups on an on-going basis; 6) contemporaneously, while various muscles are currently being exercised, bio-marker sensors will measure the current condition of a given bio-marker, such as its hemoglobin oxygen concentration, heart rate, or in immediate-time levels of measured watt output; 7) the bio-sensors will wirelessly transmit this contemporaneous bio-marker data to the bio-marker library and processor, where it will be processed; 8) watt meters measuring watts on the driving wheel axle, pedals, crank axle, forearm bars, or sliding seat will transmit their contemporaneous watt readings to the data storage bank for further processing; 9) receive relevant contemporaneous geographic data from satellites or micro-cell towers defining the location of the exerciser, store, and process this geographic data along with the biomarker and watt reading data; 10) based upon the processor's comparison of the base-line bio-marker and watt reading data to that gathered and stored in the database of computing device 346 of the current contemporaneous reading for that bio-marker or markers, the computing device 346 will calculate the amount of energy (watts) the participant should be delivering to the drive wheel from muscle groups located in the classes of muscles comprising the legs, arms, core muscles or combinations of the muscle groups simultaneously together, in order to optimize the exerciser's physical performance; and 11) once the processor has processed the relevant Biomarker data from the exerciser, and geographic data down loaded from a satellite or micro cell, it will transmit its recommended energy (watts) output that each of the exercising and monitored sets of muscle groups should be exerting. This recommended modulation muscle output data will be transmitted to the display screen 345 on the bike (See FIG. 9A), or display screen on the surface of goggles or glasses worn by the exerciser. The recommendations may also be broadcast verbally, or by some other useful means to the exerciser. Additionally, embodiments may include an assist device, such as an electric motor, that may be operated by the computing device 346 to calculate modulation recommendations between the muscle groups of the exerciser and an assist device 500 (See FIG. 1) to cause the assist device 500 to deliver power to the exercise apparatus under a condition wherein the bio marker sensor 349 senses a bio marker reading greater than a predetermined maximum reading for that particular bio marker.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. An exercising device comprising:
 a dual powered or tri-powered exercise apparatus comprising sensors for determining independent energy output of each muscle group of an exerciser providing independent energy output to operate the dual powered exercise device or the tri-powered exercise device; and
 an electronic screen operated by a computing device, the electronic screen displaying contemporaneous bio marker readings from the exerciser, and modulation recommendations of independent energy output differentiated between each muscle group operating the dual powered exercise device or the tri-powered exercise device, wherein:
  said modulation recommendations are calculated by the computing device processing baseline bio marker data stored in a database of the computing device and contemporaneous bio marker information from bio sensors operatively coupled to the computing device that measure bio marker information of the exerciser, wherein the modulation recommendations are differentiated between each muscle group by recommending a unique energy output value for each muscle group.

2. The device of claim 1, wherein the dual powered exercise apparatus comprises:
 an arm exercise apparatus operable in response to muscle exertion from and through movement of an arm of the exerciser; and
 a leg exercise apparatus operable in response to muscle exertion from and through movement of a leg of the exerciser, and
 wherein the arm exercise apparatus and the leg exercise apparatus are cooperatively operable with infinite variability of wattage input from relevant muscles of the exerciser.

3. The device of claim 2, wherein the electronic screen displays modulation recommendations for energy output of the respective arm exercise apparatus and leg exercise apparatus.

4. The device of claim 2, further comprising a resistance apparatus, wherein resistance of the resistance apparatus is adjustable to adjust resistance of a flywheel.

5. The device of claim 4, wherein the computer operating the electronic display screen is coupled to the resistance apparatus and automatically adjusts the modulation recommendation of energy from monitored muscle groups required to operate the dual powered exercise apparatus for optimal physical fitness of the exerciser, and to provide the exerciser's optimal physical performance with the resistance apparatus providing a continuous and consistent resistance.

6. The device of claim 4, wherein the computer operating the electronic display screen is coupled to the resistance apparatus and automatically adjusts the modulation recommendation of energy from monitored muscle groups required to operate the dual powered exercise apparatus for optimal physical fitness of the exerciser, and to provide the exerciser's optimal physical performance accounting for adjustments of the resistance of the resistance apparatus during use of the dual power exercise apparatus, wherein the resistance apparatus automatically adjusts in response to changes in the slope of a virtual grade.

7. The device of claim 1, wherein the biomarker information comprises lactate secretion and clearance levels, heart rate, respiratory condition, nitric oxide, hemoglobin, oxygen saturation, muscle oxygen saturation or combinations thereof.

8. The device of claim 1, wherein the baseline bio marker data is established on an on-going basis utilizing historical bio-marker, geographic, and relevant watt data.

9. An exercising device comprising:
 a tri-powered exercise apparatus;
 an electronic screen operated by a computing device, the electronic screen displaying contemporaneous bio marker readings from exerciser, and modulation recommendations for energy output delivered from the exerciser's relevant muscle groups operating the dual powered exercise device or the tri-powered exercise device, wherein: said modulation recommendations are calculated by the computing device processing baseline bio marker data stored in a database of the computing device and contemporaneous bio marker information from bio sensors operatively coupled to the computing device that measure bio marker information of the exerciser;
 an arm exercise apparatus operable in response to muscle exertion from and through movement of an arm of the exerciser;
 a core exercise apparatus operable in response to muscle exertion from and through movement of a core of the exerciser;
 a leg exercise apparatus operable in response to muscle exertion from and through movement of a leg of the exerciser, and
 wherein the arm exercise apparatus, the core exercise apparatus and the leg exercise apparatus are cooperatively operable with infinite variability of wattage input from relevant muscles of the exerciser.

10. The device of claim 9, wherein the electronic screen displays modulation recommendations for energy output of the arm exercise apparatus and the leg exercise apparatus.

11. The device of claim 9, wherein the electronic screen displays modulation recommendations for energy output of the arm exercise apparatus and the core exercise apparatus.

12. The device of claim 9, wherein the electronic screen displays modulation recommendations for energy output of the core exercise apparatus and the leg exercise apparatus.

13. The device of claim 9, wherein the electronic screen displays modulation recommendations for energy output of the arm exercise apparatus, the core exercise apparatus and the leg exercise apparatus.

14. The device of claim 9, further comprising a resistance apparatus, wherein resistance of the resistance apparatus is adjustable to adjust a flywheel, a sliding seat, or combinations thereof.

15. The device of claim 14, wherein the computer operating the electronic display screen is coupled to the resistance apparatus and automatically adjusts the modulation recommendation of energy required to operate the tri-powered exercise apparatus for optimal physical fitness of the exerciser with the resistance apparatus providing a continuous and consistent resistance.

16. The device of claim 14, wherein the computer operating the electronic display screen is coupled to the resistance apparatus and automatically adjusts the modulation recommendation of energy required to operate the tri-powered exercise apparatus for optimal physical fitness of the exerciser accounting for adjustments of the resistance of the resistance apparatus during use of the tri-powered exercise apparatus, wherein the resistance apparatus automatically adjusts in response to changes in the slope of a virtual grade.

17. An exercising device comprising:
a dual powered exercise apparatus;
an electronic screen operated by a computing device, the electronic screen displaying contemporaneous bio marker readings from an exerciser, and modulation recommendations for energy output delivered from the exerciser's relevant muscle groups operating the dual powered exercise device or the tri-powered exercise device, wherein: said modulation recommendations are calculated by the computing device processing baseline bio marker data stored in a database of the computing device and contemporaneous bio marker information from bio sensors operatively coupled to the computing device that measure bio marker information of the exerciser;
an arm exercise apparatus operable in response to muscle exertion from and through movement of an arm of the exerciser; and
a core exercise apparatus operable in response to muscle exertion from and through movement of a core of the exerciser, and
wherein the arm exercise apparatus and the core exercise apparatus are cooperatively operable with infinite variability of wattage input from relevant muscles of the exerciser.

18. The device of claim 17, wherein the electronic screen displays modulation recommendations for energy output of the respective arm exercise apparatus and core exercise apparatus.

19. The device of claim 17, further comprising a resistance apparatus, wherein resistance of the resistance apparatus is adjustable to adjust resistance of the flywheel.

20. The device of claim 19, wherein the computer operating the electronic display screen is coupled to the resistance apparatus and automatically adjusts the modulation recommendation of energy from monitored muscle groups required to operate the dual powered exercise apparatus for optimal physical fitness of the exerciser, and to provide the exerciser's optimal physical performance with the resistance apparatus providing a continuous and consistent resistance.

21. The device of claim 19, wherein the computer operating the electronic display screen is coupled to the resistance apparatus and automatically adjusts the modulation recommendation of energy from monitored muscle groups required to operate the dual powered exercise apparatus for optimal physical fitness of the exerciser, and to provide the exerciser's optimal physical performance accounting for adjustments of the resistance of the resistance apparatus during use of the dual power exercise apparatus, wherein the resistance apparatus automatically adjusts in response to changes in the slope of a virtual grade.

22. An exercising device comprising:
a dual powered exercise apparatus;
an electronic screen operated by a computing device, the electronic screen displaying contemporaneous bio marker readings from an exerciser, and modulation recommendations for energy output delivered from the exerciser's relevant muscle groups operating the dual powered exercise device or the tri-powered exercise device, wherein: said modulation recommendations are calculated by the computing device processing baseline bio marker data stored in a database of the computing device and contemporaneous bio marker information from bio sensors operatively coupled to the computing device that measure bio marker information of the exerciser;
a leg exercise apparatus operable in response to muscle exertion from and through movement of a leg of the exerciser; and
a core exercise apparatus operable in response to muscle exertion from and through movement of a core of the exerciser, and
wherein the leg exercise apparatus and the core exercise apparatus are cooperatively operable with infinite variability of wattage input from relevant muscles of the exerciser.

23. The device of claim 22, wherein the electronic screen displays modulation recommendations for energy output of the respective leg exercise apparatus and core exercise apparatus.

24. The device of claim 22, further comprising a resistance apparatus, wherein resistance of the resistance apparatus is adjustable to adjust resistance of the flywheel.

25. The device of claim 24, wherein the computer operating the electronic display screen is coupled to the resistance apparatus and automatically adjusts the modulation recommendation of energy from monitored muscle groups required to operate the dual powered exercise apparatus for optimal physical fitness of the exerciser, and to provide the exerciser's optimal physical performance with the resistance apparatus providing a continuous and consistent resistance.

26. The device of claim 24, wherein the computer operating the electronic display screen is coupled to the resistance apparatus and automatically adjusts the modulation recommendation of energy from monitored muscle groups required to operate the dual powered exercise apparatus for optimal physical fitness of the exerciser, and to provide the exerciser's optimal physical performance accounting for adjustments of the resistance of the resistance apparatus during use of the dual power exercise apparatus, wherein the resistance apparatus automatically adjusts in response to changes in the slope of a virtual grade.

* * * * *

UNITED STATES PATENT AND TRADEMARK OFFICE
CERTIFICATE OF CORRECTION

PATENT NO. : 10,569,129 B2
APPLICATION NO. : 15/683535
DATED : February 25, 2020
INVENTOR(S) : Thomas S. Felker It is certified that error appears in the above-identified patent and that said Letters Patent is hereby corrected as shown below:

In the Specification

Column 16 Line 7 should read as follows:
The computing device 346 may include, but is not limited to: a radio to receive and transmit data, data storage system, and processor to process such stored and newly received data within the data storage system. The computing device 346 will perform various functions including, but not limited to the following: 1) store, in a biologic, geographic, and watt output database, a library of historical biologic metrics, geographic, and watt output information for a particular exerciser or exercisers developed during prior exercising activities; 2) Store other biologic data regarding the specific exerciser gathered from the riders' prior physical exercising activities; this biologic data can include, but is not limited to: heart rate, blood pressure, oxygen uptake capacity, red blood cell count, lactate clearance and threshold, lactate secretion, respiratory condition, nitric oxide, hemoglobin, oxygen saturation, muscle oxygen saturation, and oxygenation condition, or combinations thereof; 3) Store the geographic characteristics of prior and current treks which include for example: total elevation, number of hills, their grade and length, total surface distance of the treks, and location of the rider on the trek at specific times when asking the processor to make its muscle group modulation recommendations; 4) store the watt readings associated with each biomarker reading; 5) utilizing historical bio-marker, geographic, and relevant watt data, the processor will calculate and establish a base line of optimum watt output levels for the exerciser's various classes of muscle groups on an on-going basis; 6) contemporaneously, while various muscles are currently being exercised, bio-marker sensors will measure the current condition of a given bio-marker, such as its hemoglobin oxygen concentration, heart rate, or in immediate-time levels of measured watt output; 7) the bio-sensors will wirelessly transmit this contemporaneous bio-marker data to the bio-marker library and processor, where it will be processed; 8) watt meters measuring watts on the driving wheel axle, pedals, crank axle, forearm bars, or sliding seat will transmit their contemporaneous watt readings to the data storage bank for further processing; 9) receive relevant contemporaneous geographic data from satellites or micro-cell towers defining the location of the exerciser, store, and process this geographic data along with the biomarker and watt reading data; 10) based upon the processor's comparison of the base-line bio-marker and watt reading data to that gathered and stored in the database of computing device 346 of the current contemporaneous reading for that bio-marker or markers, the computing device 346 will Signed and Sealed this
Seventeenth Day of November, 2020

Andrei Iancu
*Director of the United States Patent and Trademark Office* calculate the amount of energy (watts) the participant should be delivering to the drive wheel from muscle groups located in the classes of muscles comprising the legs, arms, core muscles or combinations of the muscle groups simultaneously together, in order to optimize...